(12) United States Patent
Bashirullah et al.

(10) Patent No.: US 12,508,421 B2
(45) Date of Patent: Dec. 30, 2025

(54) SYSTEM AND METHOD FOR MONITORING RESPONSE TO NEUROMODULATION

(71) Applicant: Galvani Bioelectronics Limited, Stevenage (GB)

(72) Inventors: Rizwan Bashirullah, Collegeville, PA (US); Gerald Edwin Hunsberger, Collegeville, PA (US)

(73) Assignee: GALVANI BIOELECTRONICS LIMITED (GB)

( * ) Notice: Subject to any disclaimer, the term of this patent is extended or adjusted under 35 U.S.C. 154(b) by 826 days.

(21) Appl. No.: 17/619,572

(22) PCT Filed: Jun. 17, 2020

(86) PCT No.: PCT/GB2020/051454
§ 371 (c)(1),
(2) Date: Dec. 15, 2021

(87) PCT Pub. No.: WO2020/254795
PCT Pub. Date: Dec. 24, 2020

(65) Prior Publication Data
US 2022/0296886 A1 Sep. 22, 2022

Related U.S. Application Data

(60) Provisional application No. 62/863,773, filed on Jun. 19, 2019.

(51) Int. Cl.
*A61N 1/05* (2006.01)
*A61B 5/388* (2021.01)
*A61N 1/36* (2006.01)

(52) U.S. Cl.
CPC ............ *A61N 1/0556* (2013.01); *A61B 5/388* (2021.01); *A61N 1/36135* (2013.01); *A61N 1/36157* (2013.01); *A61N 1/36185* (2013.01)

(58) Field of Classification Search
None
See application file for complete search history.

(56) References Cited

U.S. PATENT DOCUMENTS

| | | | | |
|---|---|---|---|---|
| 5,095,905 A | * | 3/1992 | Klepinski | A61N 1/0556 600/377 |
| 2011/0264182 A1 | * | 10/2011 | Cowley | A61N 1/0556 607/118 |

(Continued)

FOREIGN PATENT DOCUMENTS

| | | |
|---|---|---|
| EP | 2217323 A1 | 8/2010 |
| WO | 2017219096 A1 | 12/2017 |

OTHER PUBLICATIONS

Sep. 7, 2020—(WO) International Search Report and Written Opinion—App PCT/GB2020/051454.

*Primary Examiner* — Mallika D Fairchild
(74) *Attorney, Agent, or Firm* — McAndrews, Held & Malloy, Ltd.

(57) ABSTRACT

A neuromodulation device for measuring an evoked response comprising a first electrode; a second electrode, wherein the first and second electrodes are alternately configured as a stimulation electrode; a sensing electrode for sensing an evoked response to a stimulus pulse; and a controller configured to measure an evoked response at the sensing electrode after a stimulus pulse at a first stimulation electrode configuration and after a stimulus pulse at a second alternate stimulation electrode configuration, and to add said pair of measurements.

23 Claims, 21 Drawing Sheets

(56) References Cited

U.S. PATENT DOCUMENTS

| | | |
|---|---|---|
| 2014/0194772 A1 | 7/2014 | Single et al. |
| 2014/0214135 A1* | 7/2014 | Ben-David .......... A61N 1/0556 607/116 |
| 2016/0106980 A1 | 4/2016 | Surth et al. |
| 2018/0228391 A1 | 8/2018 | Parker et al. |
| 2019/0151658 A1 | 5/2019 | Jia et al. |

* cited by examiner

SYSTEM AND METHOD FOR MONITORING RESPONSE TO NEUROMODULATION

CROSS-REFERENCE TO RELATED APPLICATIONS

The present application is a U.S. National Phase of International Application No. PCT/GB2020/051454, which was filed on Jun. 17, 2020, designating the United States of America and claiming priority to U.S. Provisional Application No. 62/863,773, filed on Jun. 19, 2019. This application claims priority to and the benefit of the above-identified applications, which are all fully incorporated by reference herein in their entireties.

The present disclosure is related to embodiments of extravascular and intravascular neural interface devices containing electrodes for neuromodulation of a target, for example neurovascular bundles and for monitoring the target anatomy's response to activation of the electrodes. The devices may be formed as an extravascular neural interface, such as a nerve cuff, a lead electrode or a surface electrode, or an intravascular neural interface, such as an intravascular stent. Once positioned within or around a target anatomy, e.g., a neurovascular bundle, the electrodes may activate or inhibit nerve activity in the anatomy, which can be measured with sensors within the devices by detecting evoked compound action potentials (eCAP) and/or impedance that result from the electrical stimulation of the nerves. Changes in eCAPs and/or impedance and/or blood flow may correlate to the effectiveness of the neuromodulation.

CROSS-REFERENCES TO RELATED APPLICATIONS

Not Applicable.

STATEMENT AS TO THE RIGHTS TO INVENTIONS MADE UNDER FEDERALLY SPONSORED RESEARCH OR DEVELOPMENT

Not Applicable.

BACKGROUND

Devices for stimulating nerves (i.e. neuromodulation devices) require means to monitor that stimulation is delivered at the correct level, measure target engagement and measure effectiveness of dosing.

In some cases, a direct or immediate feedback is not available to monitor an effect of neuromodulation, more specifically neuromodulation therapy. Therefore, there exists a need to measure, estimate or monitor the amount of neural actuation or stimulation induced in a nerve.

Depending on the response detected as well as the target from which the responses is being detected from, a high level of noise may be present in the detected response. This can be problematic when attempting to accurately estimate the amount of neural actuation or stimulation induced in a nerve, and hence an accurate means to monitor that stimulation is delivered at the correct level, measure target engagement and effectiveness of dosing.

Therefore, there also exists a need for an improved estimate the amount of neural actuation or stimulation induced in a nerve despite the potential noise in the signal, and thus monitor efficacy of neuromodulation.

The present disclosure addresses at least the problems described above.

DETAILED DESCRIPTION

The present disclosure is related to embodiments of neural interface devices containing electrodes for neuromodulation of a target, as well as for monitoring the efficacy of the neuromodulation.

In embodiments, neuromodulation by electrical or other means can be used to stimulate or inhibit nerve activity for the purpose of eliciting a desired targeted physiological effect for the treatment of disease. A measure of such target engagement can be made through detection of an eCAP, a summed response from a large number of individual action potential fiber responses. The eCAPs produced by electrical stimulation can be used as confirmation of proper placement of a neural interface containing electrodes for neurostimulation, for example, in an intraoperative setting. eCAP detection may also be used to monitor the effectiveness of dosing by correlating the magnitude of the response for a given dose with disease progression over time.

Detection of eCAP response is desirable since it represents a direct measurement of evoked nerve activity. However, detection of eCAP responses can be hindered by undesired artefacts and noise introduced by the stimulation signal used to evoke the desired responses, thereby placing significant constraints on the signal conditioning hardware chain required to detect the eCAP response. This effect is exacerbated when detecting eCAP responses from slowly conducting autonomic c-fibers, which require large stimulation amplitudes owing to high activation thresholds but produce eCAP responses of very small amplitudes. Furthermore, when the desired target nerve travels alongside vessels and arteries that form neurovascular bundles, such as in the case of the splenic nerve along the splenic artery ending in the spleen, the activation of the nerve will also produce smooth muscle responses that introduce additional motion artefacts.

In embodiments of the present disclosure, an improved measurement of eCAP responses is achieved despite the above described artefacts and noise.

Figure 1A:
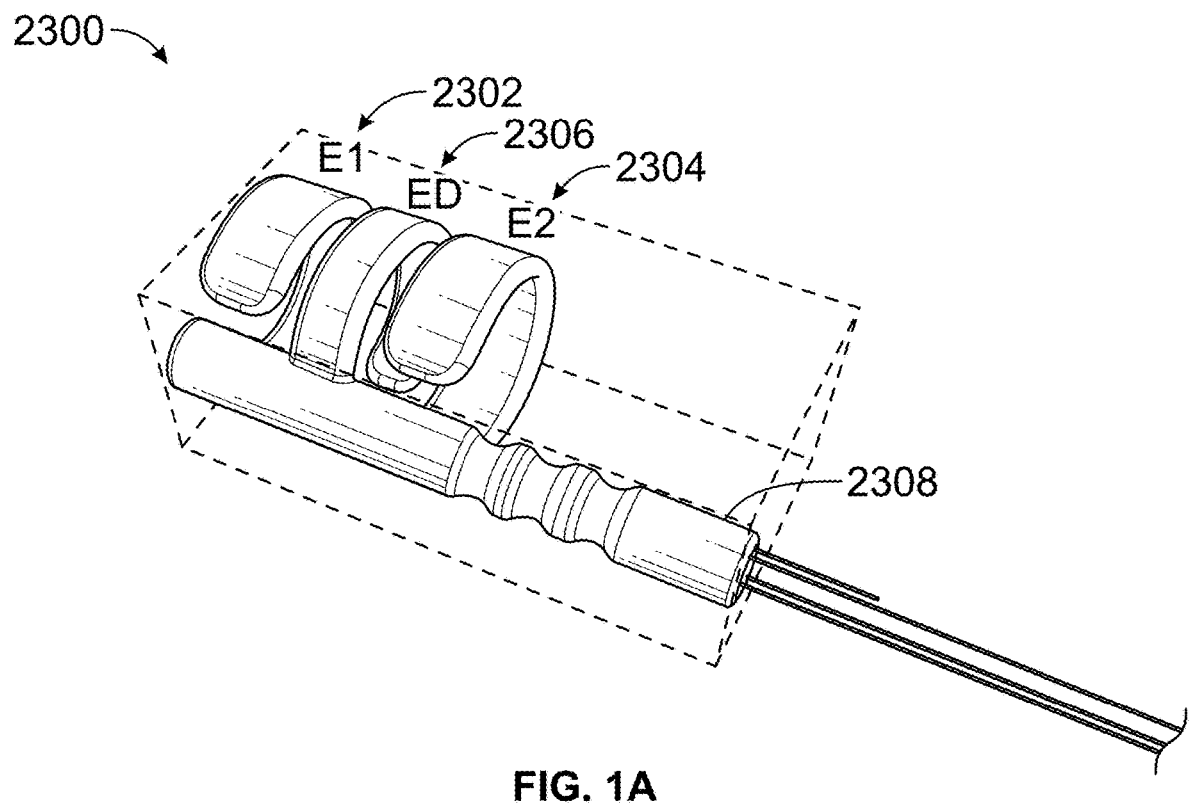
FIG. 1A is an illustration of a cuff electrode device.
Figure 1B:
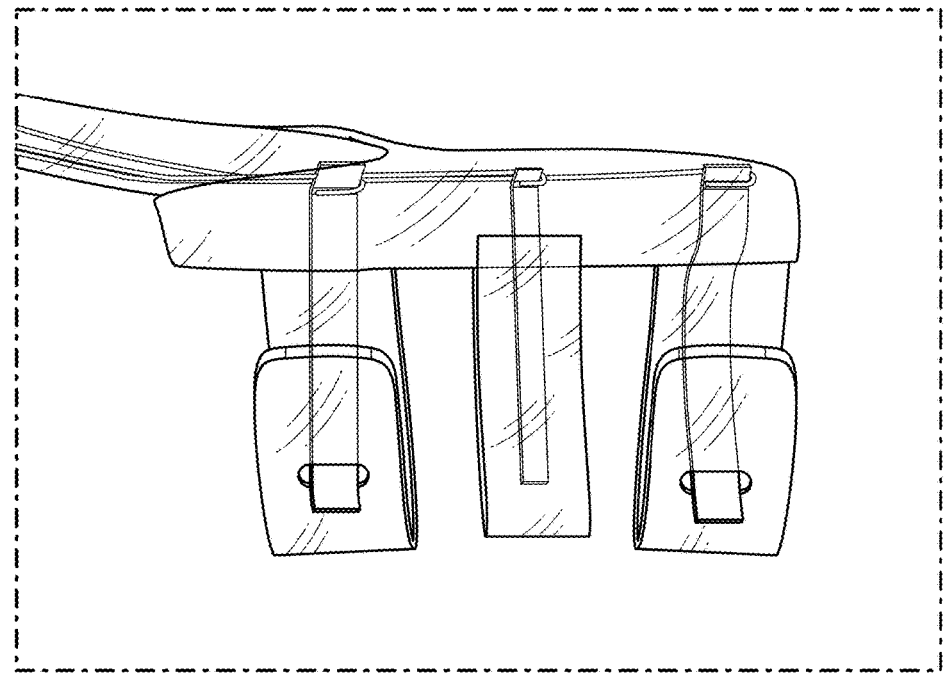
FIG. 1B is an illustration of a cuff electrode device having a body formed of translucent material thereby making the electrodes visible.

In embodiments, a device for neuromodulation and monitoring an evoked response comprises electrodes provided in a neural interface in the form of a neural cuff, as illustrated in FIG. 1A and FIG. 1B. The extravascular neural cuff may be placed around a target, such as a splenic neurovascular bundle, positioned to contact tissue. The electrode is arranged in as a tripolar design. The device includes a silicone molded cuff 2300 with at least three distinct curved arms extending from a spine. FIG. 1B illustrates the cuff 2300 with a translucent silicone mold so it is possible to see some of the electrodes and interconnections therein. A plurality of stimulating electrodes may be placed within the outside arms 2302 and 2304 (respectively, E1 and E2) symmetrically about the center arm 2306 (ED) to neuromodulate a target neurovascular bundle. A plurality of sensing electrodes may be placed in the center arm (ED) to measure evoked compound action potentials (eCAP). A connecting lead 2308 configured to apply stimulation signals from an implantable pulse generator (not shown) to the stimulating electrodes 2302 and 2304 (E1 and E2) and record the resultant evoked response from the sensing electrode 2306 (ED).

Although in the embodiments the neural interface is described in the form of a neural cuff as an example for ease of illustration of implementation, it will be appreciated by those skilled in the art that the form of the neural interface is not limited only to a neural cuff. The neural interface may take various other forms, for example other cuff type electrodes such as spiral cuff, helical cuff or wrap around cuff, or even flat interface electrodes, mesh electrodes, linear rod-shaped lead electrodes, paddle-style lead electrodes, disc contact electrodes, hook electrodes, sling electrodes, intrafascicular electrode, intravascular electrode, glass suction electrodes, paddle electrodes, and percutaneous cylindrical electrodes may be used. The electrodes may be arranged in the manner described below regardless of the specific form of the neural interface.

The spatial arrangement of the outer electrodes, which may also be referred to as first and second electrodes, in relation to the sensing electrode located between the outer electrodes assists in cancelling artefacts created during stimulation in order to improve eCAP measurements. This is described in more detail below in relation to the electrode arrangements and biphasic stimulation pulses alternating in polarity.

Figure 2A:
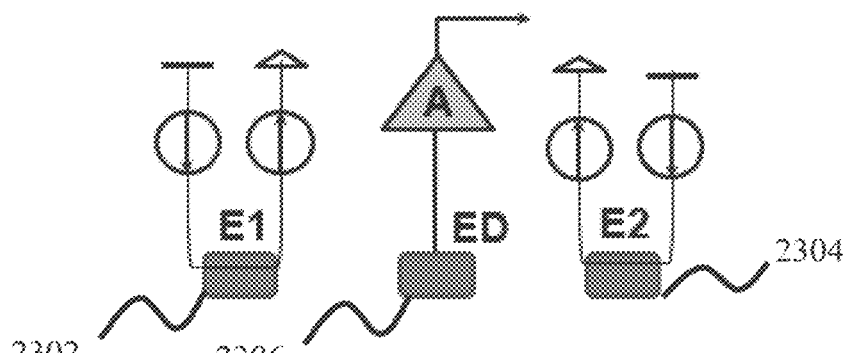
FIG. 2A is an illustration of an electrical configuration of a neuromodulation device having bipolar stimulating electrodes and one or more sensing electrodes in accordance with an embodiment.
Figure 2B:
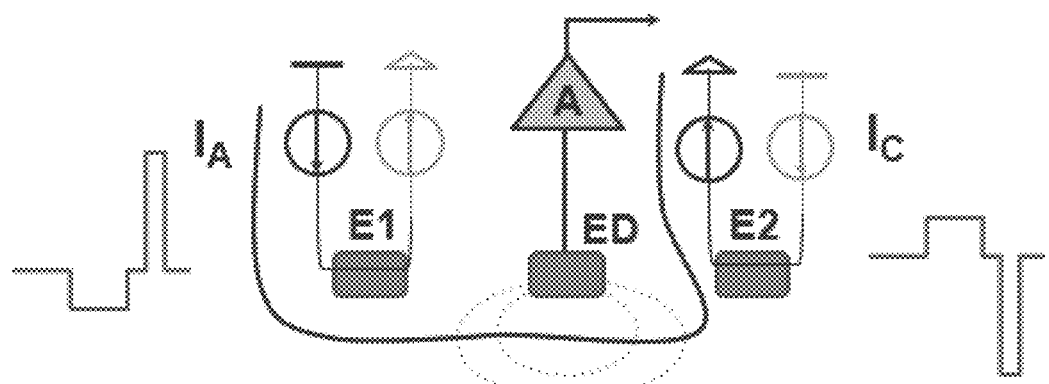
FIG. 2B is a first configuration of the neuromodulation device of FIG. 2A.
Figure 2C:
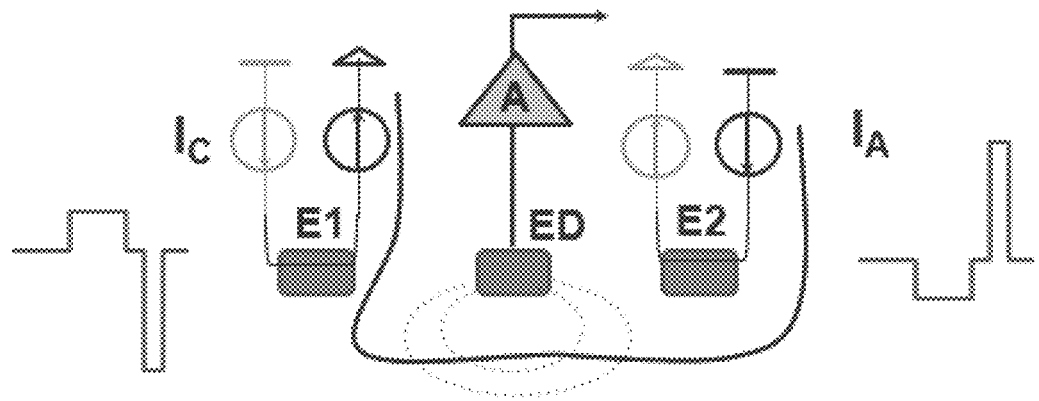
FIG. 2C is a second configuration of the neuromodulation device of FIG. 2A.

As illustrated in FIG. 2A, the electrode (or a plurality of electrodes) in the middle arm 2306 (ED) may interconnected and placed in the middle and substantially equidistant with respect to the two outer electrodes 2302 and 2304 (E1 and E2). The electrode separation pitch between the outer stimulation electrodes (E1 or E2) and the middle arm electrode (ED) may be between 3 mm and 4 mm. Other examples of the separation pitch between the electrodes may be between 2-10 mm, preferably 2-4 mm. Other distances can be used depending on the specific neural interface structure and its metric. As shown in FIG. 2B, the two outer stimulation electrodes (E1 and E2) may be configured to deliver biphasic stimulus pulses with electrode E2 as the cathode, also referred to as a stimulating electrode, and electrode E1 as the anode, also referred to as a source electrode. As shown in FIG. 2C, the stimulation electrodes (E1 and E2) may also be configured to deliver biphasic stimulus pulses with electrode E2 as the anode and electrode E1 as the cathode. In other words, the outer electrodes are configured to be driven in a bipolar alternating configuration such that the stimulus polarity of consecutive stimulus pulses are alternated.

Figure 3:
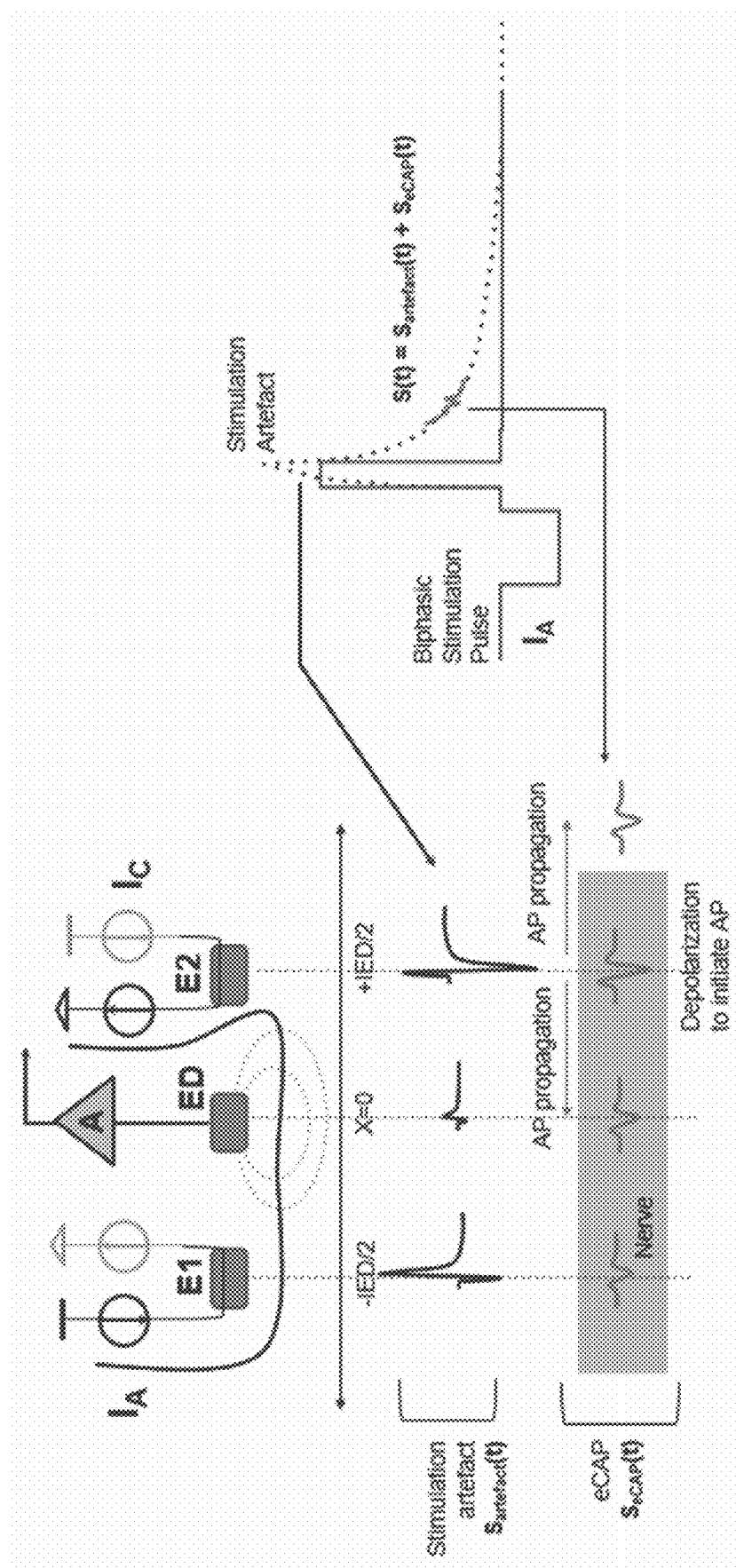
FIG. 3 is an illustration of a measurement comprising stimulation artefact and eCAP response produced by the electrodes of the neuromodulation device of FIG. 2A, where the stimulation artefact is partially cancelled in a middle sense electrode.

FIG. 3 illustrates, on the right-hand side, a biphasic stimulation pulse which is used to provide stimulation to the target. A stimulation artefact curve (as measured by the sensing electrode, ED) is shown in dotted line, overlapping the biphasic stimulation pulse. A full stimulation artefact curve is shown on the left-hand side, in a smaller version under each electrode, E1, ED and E2. After the biphasic stimulation pulse, a small pulse (also measured by the sensing electrode) which represents the eCAP response can be seen overlapping the stimulation artefact. This small pulse can be distinguished from the stimulation artefact, as the stimulation artefact is in a dotted line, and this small pulse representing the eCAP response is in a solid line. This small pulse is enlarged on the left-hand side, below the stimulation artefact curves.

As can be seen in FIG. 3, a clean eCAP response can be difficult to discern from stimulation artefacts and other undesirable noise sources.

As further illustrated in FIG. 3, the device of FIG. 2A may be configured so that stimulus on stimulating electrode, which in this case is E2 depolarizes the region under the electrode so as to elicit a neural response which propagates both upstream and downstream with equal polarity. This can be seen as the largest action potential pulse underneath where the stimulating electrode, E2 is positioned, with action potential (AP) propagation occurring both upstream and downstream, indicated by the arrows.

Figure 4:
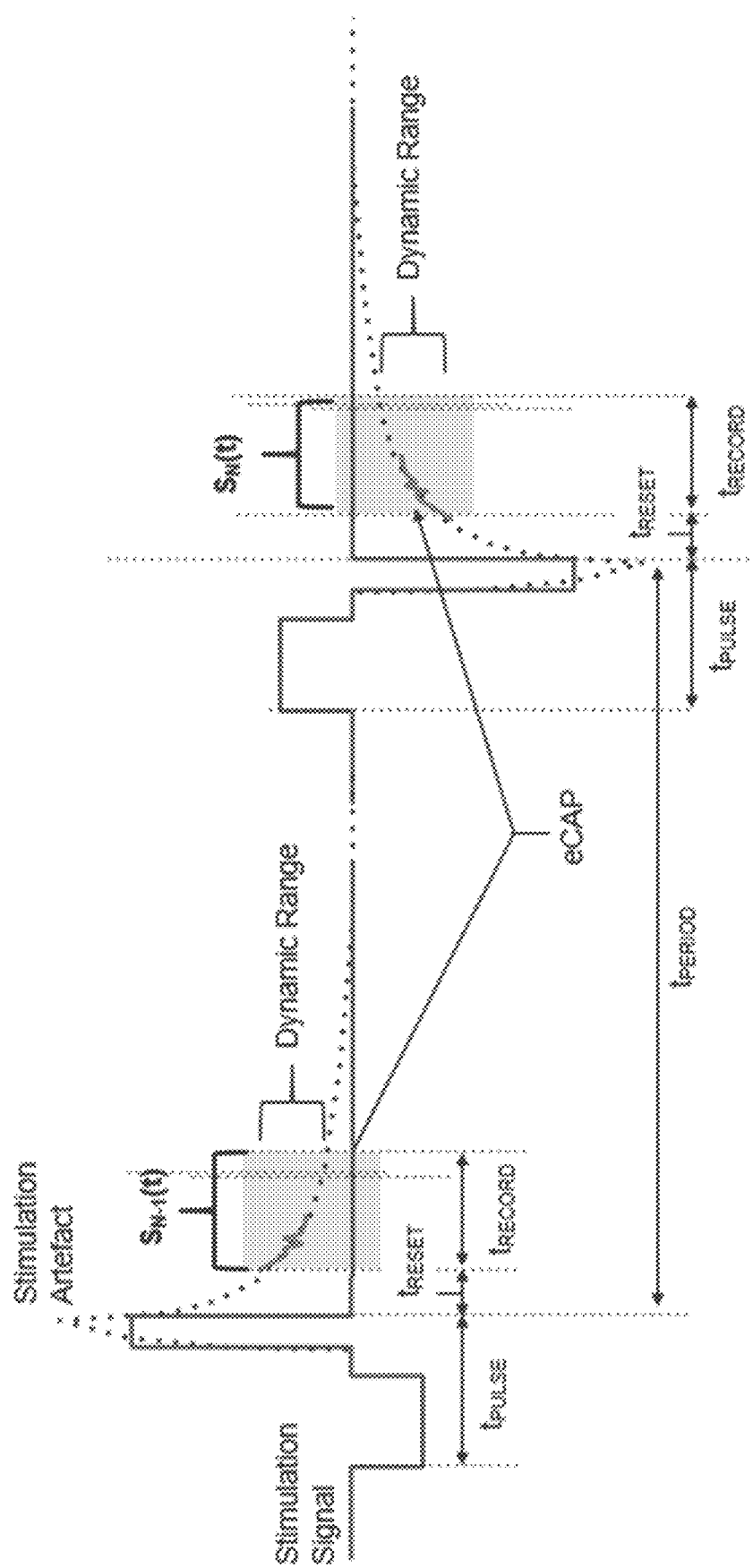
FIG. 4 is an illustration of alternating biphasic stimulus, wherein measurement is recorded for a fixed record length.

FIG. 4 illustrates consecutive stimulation pulse which has been alternated in polarity by switching the stimulation electrode between the first and second outer electrodes, E1 and E2. Overlapping the stimulation pulse, a stimulation artefact (along with the eCAP response, which is difficult to discern from the stimulation artefact) as measured by the sensing electrode, ED, can be seen. In other words, FIG. 4 illustrates a measurement made by the sensing electrode, ED, after a stimulation pulse according to FIG. 2B, and after a stimulation pulse according to FIG. 2C.

Figure 5:
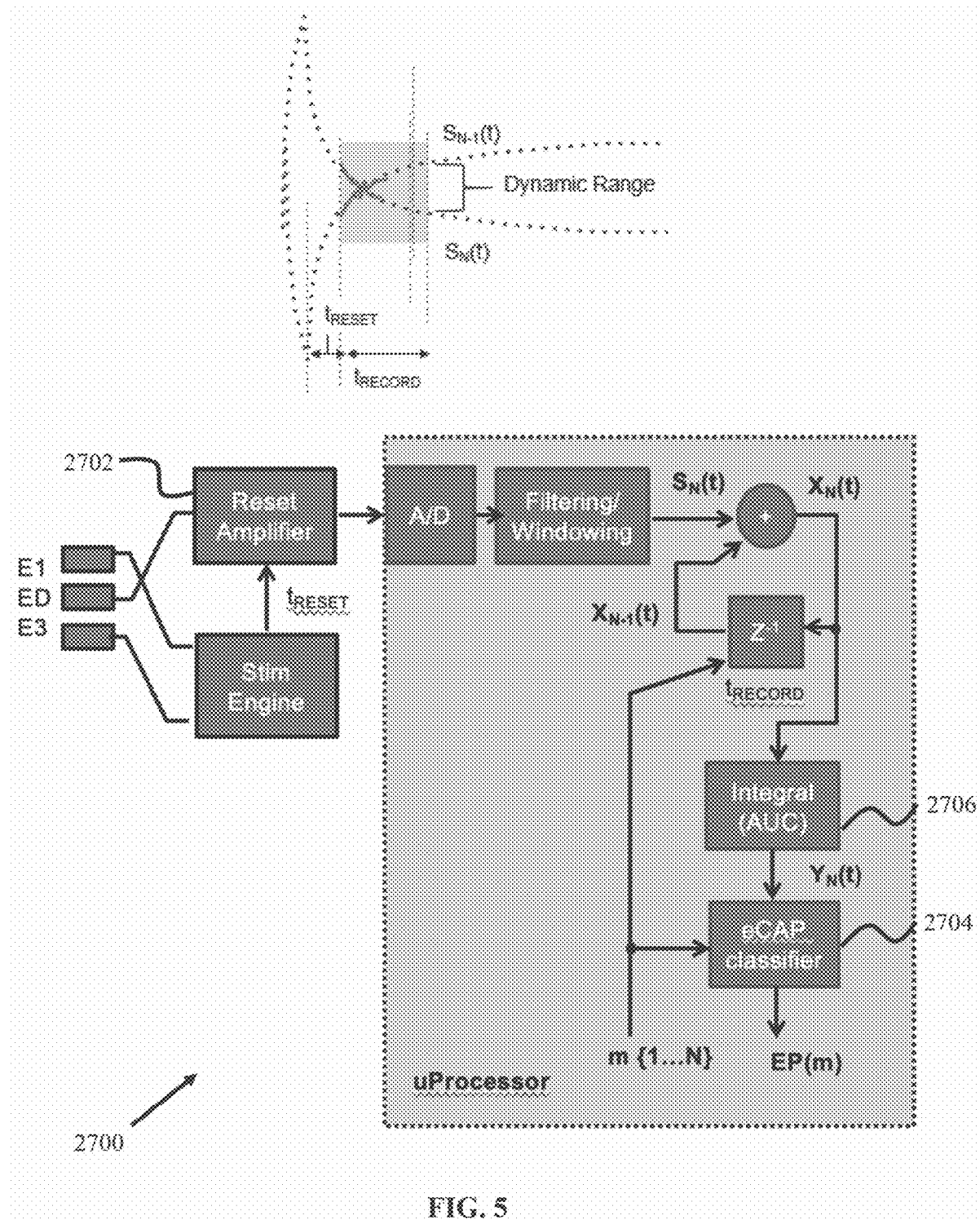
FIG. 5 is an illustration of a signal conditioning chain for the neuromodulation device of FIG. 2A configured for neural response sensing.

As illustrated in the top portion of FIG. 5, it can be seen that by adding the measurement at the sensing electrode, ED, after two consecutive alternating pulses, the stimulation artefacts are cancelled. On the other hand, the resulting evoked response (eCAP measurement) from the alternating biphasic pulses add constructively in the center sensing electrode.

In other words, the sensing electrode ED being interconnected and placed equidistance to the two stimulating electrodes E1 and E2 which are driven in a bipolar alternating configuration leads to stimulation artefacts produced by the stimulating electrodes E1 and E2 to add destructively to cancel in the middle electrode ED, whilst the resulting eCAP response add constructively, thereby improving the signal to noise ratio of the propagated activity potential inside the nerve bundle produced by the stimulating electrode.

Even if the sensing electrode is not centrally located, alternating pulses and averaging pairs of measurements from alternating pulses would provide reduction. However, further reduction of noise can be seen with central placement.

Figure 20A:
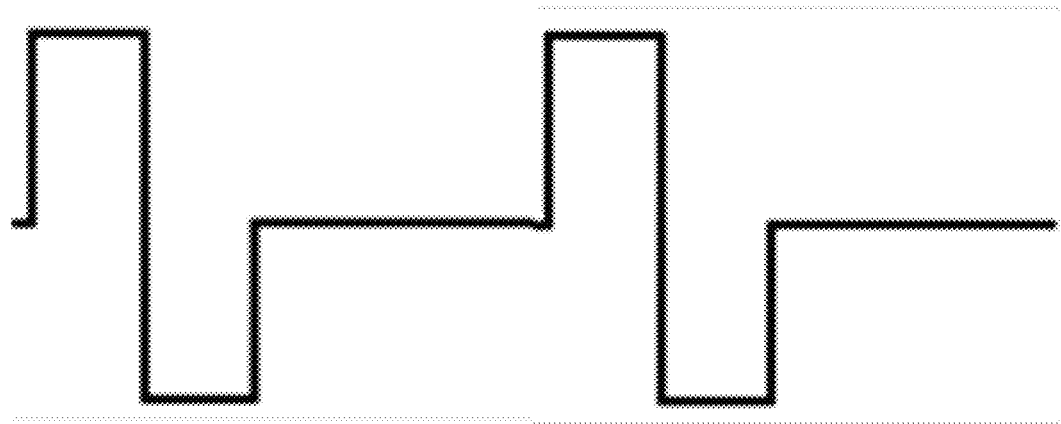
FIG. 20A illustrates standard biphasic sequence.
Figure 20B:
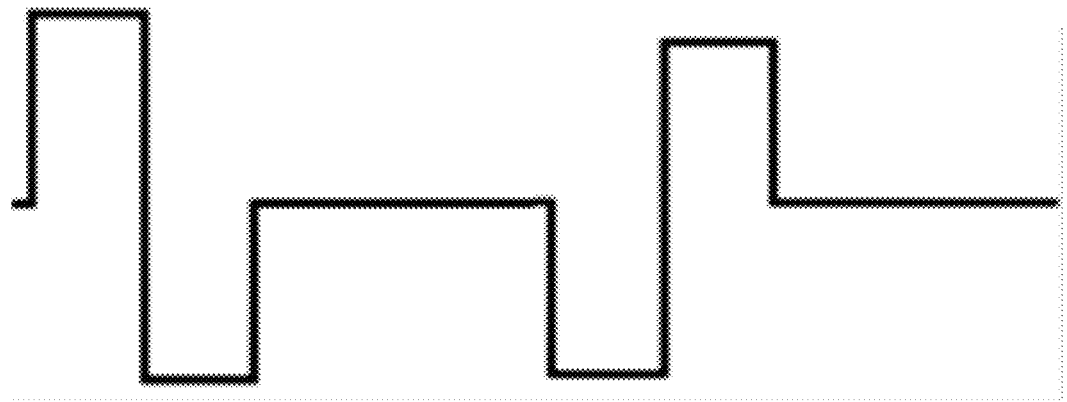
FIG. 20B illustrates alternating biphasic sequence.

The detection may be further improved by alternating the cathode between electrode E1 and E2 and averaging the output of electrode ED over a number of alternating pulses (i.e. over a number of consecutive pulses where the stimulus polarity of the consecutive pulses are alternated). Averaging over multiple consecutive even numbered responses evoked by the applied alternating biphasic stimulus can be used to significantly improve the signal-to-noise ratio. FIG. 20A illustrates standard biphasic sequence, and 20B illustrates alternating biphasic sequence.

As further illustrated in FIG. 4, in an embodiment, the middle sense electrode (ED) may be coupled to an input reset amplifier that is kept in a reset state until $t_{RESET}$ delay after the transition edge of the stimulus pulse. The input reset amplifier measurement may be enabled for a fixed record length of $t_{RECORD}$. In an embodiment, the $t_{RESET}$ and $t_{RECORD}$ may be programed by a control unit 2700, as further illustrated in FIG. 5. The $t_{RESET}$ and $t_{RECORD}$ can be determined based on propagation velocity of desired fiber type and spatial wavelength for fixed dimensional constraints that are known a-priori. Thus, the reset amplifier can be timed optimally to record from the sensing electrode so as to minimize the required dynamic range of the analog front-end amplifier and analog-to-digital converter (ADC).

As shown in FIG. 5, the output of the reset amplifier 2702 may be sampled, quantized, filtered and windowed by a digital processor. The output may then be averaged across the $t_{RECORD}$ length. The averaged output may be further processed to compute the area under the curve (AUC) or the integral of the neural responses across 'm' measurement cycles. An eCAP signal classifier 2704 may be used to compute a linear projection of the artefact AUC 2706 that result from a sequence of stimulation pulses ramped from zero amplitude to the desired amplitude dose. The eCAP signal classifier 2704 may compute the projection of the maximal dose AUC onto the estimated artefact AUC as the Euclidean distance measure for detecting an eCAP dose response, which is further discussed below.

A further challenge to measuring a response to neuromodulation is to quantitatively measure the level of nerve activation or recruitment as a function of the applied dose, especially in a therapeutic setting with fixed dosing parameters delivered on a prescribed dosing schedule. In other words, a fixed electrical dose will generate a response representative of a single measured point in a dose response curve. Without the complete dose response curve, it is difficult to determine where in the curve the measurement lies (e.g. quantitative measure of the response) or even whether the measured response is valid measurement, particularly in cases where the eCAP is not easily discernable due to the aforementioned reasons.

Figure 6:
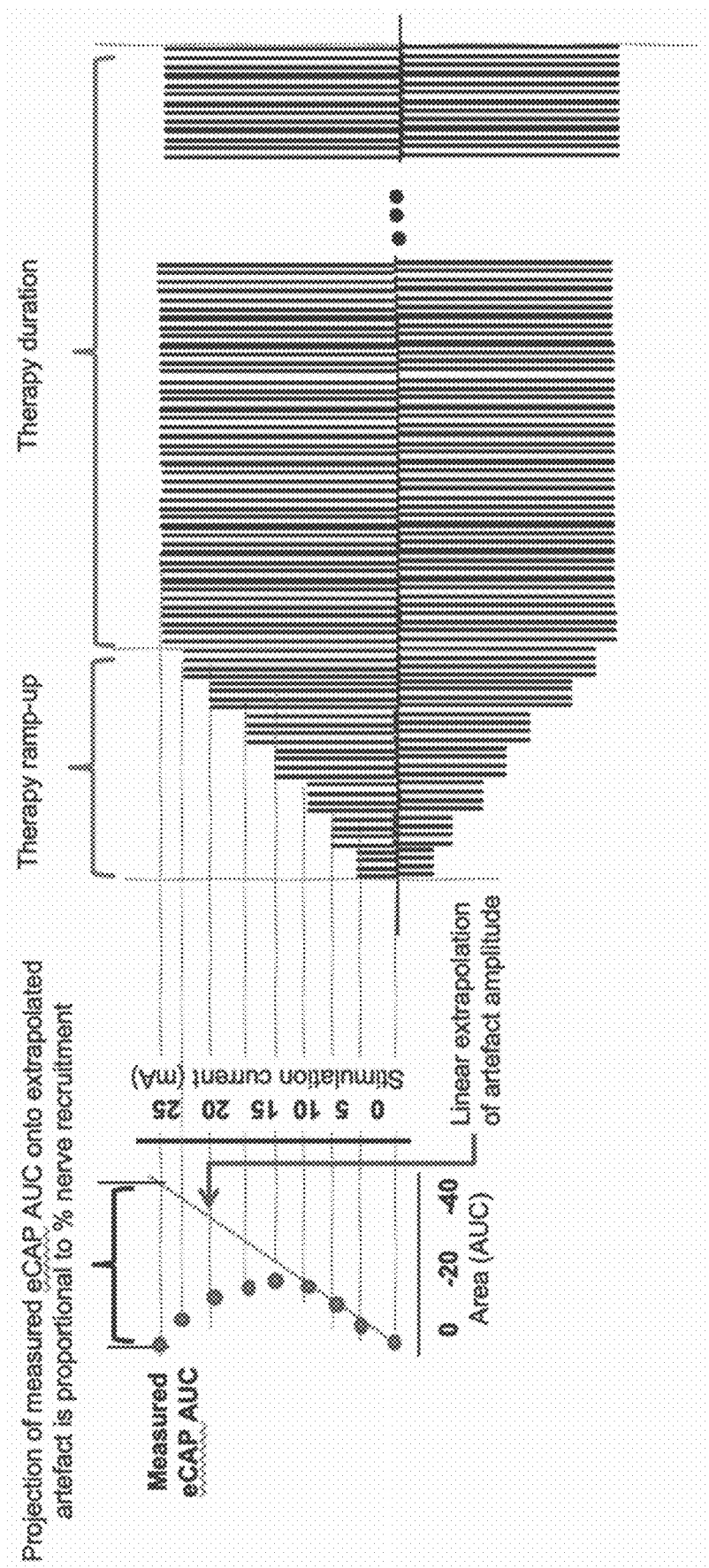
FIG. 6 is an illustration of a therapy amplitude ramp stimulus sequence to extrapolate the artefact noise contribution.

In embodiments, a dose response during a scheduled therapeutic session is captured by measuring the evoked response while the stimulation pulses are ramped in amplitude to the desired dose. This is illustrated in FIG. 6.

Many known pulse generators have capability to ramp up the amplitude and duty cycle gradually to the desired therapeutic dosing level in order to avoid sudden undesirable perceptual effects.

In embodiments, the ramp feature is incorporated as part of the programmed schedule therapy sequence. Since the evoked response is proportional to the applied stimulus amplitude, more specifically the charge/phase delivered, an amplitude ramp sequence is pre-programmed to measure and store a dose response curve.

Recording responses during the ramp-up phase means that until a stimulation threshold is reached, the resulting signals at low amplitudes is primarily due to stimulus artefact, and the evoked nerve response is barely detectable. As the applied stimulus is progressively ramped, so is the amplitude of the measured artefact. Example data and traces based on the data are shown in FIGS. 7-8. In fact, as shown in FIG. 8B, the artefact measured by the area-under-the-curve (AUC) over a specified time interval is shown to be linearly dependent on dosing. Deviations from this measure of response by the AUC metric is therefore solely caused by the evoked nerve activity. One can therefore linearly extrapolate the trajectory of the measured artefact from the initial measured responses during the ramp-up phase, and use the projection of the actual evoked AUC onto the extrapolated estimate of the artefact to obtain a quantifiable measurement of the evoked nerve response, as shown in FIGS. 6 and 9. The Euclidean distance of this projection represents a proportional dose dependent measure of the evoked nerve response.

Figure 12:
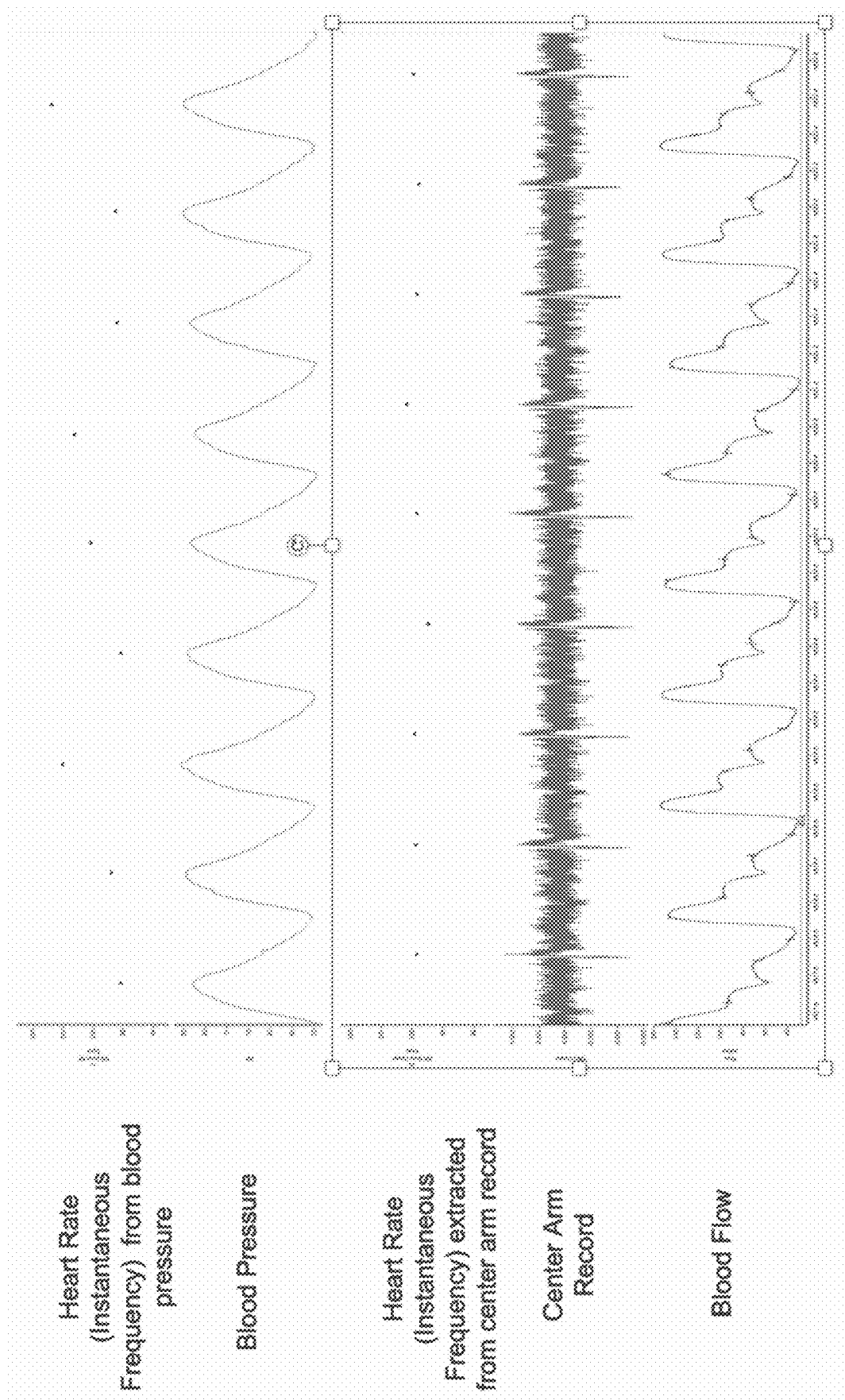
FIG. 12 is an illustration of measured heart-rate using the cuff configuration in FIG. 1A.

In some embodiments, it may also be feasible to detect the heart-rate from the cuff electrode recordings as shown in FIG. 12. A particularly useful measure is to use heart-rate variability to estimate disease progression longitudinally.

The following is a description of method used to obtain some of the data discussed herein.

A three-arm cuff (for example one shown in FIG. 1) was placed around the splenic artery and plexus. At the time of implant, an Ag/AgCl pellet was also introduced to the surgical cavity, this served as a ground reference, and as the positive counter electrode in monopolar eCAP recordings. A sub Q pocket was also introduced and a 25 mm square platinum plate added to the pocket to serve as a stimulation return in monopolar stimulations. Using subthreshold stimulations (0.5 mA-1 mA), shock artefacts were recorded from the side or center arm electrode for monopolar or bipolar stimulation under standard stimulation sequences or the flip flop sequence as described above. After assessing shock artefacts, a current response curve was generated with alternating bipolar stimulation on electrodes E1 and E2, with eCAP recording on the center electrode, ED and the Ag/AgCl pellet.

ED recorded eCAP were amplified and filtered. Nerve activity was recorded to a computer using a sampling rate of 15-20 kHz. An average of 10 pulses were utilized in data analysis. An even number of pulses in the average serves to more accurately remove the shock artefact using the alternating stimulation wave. Pulse 3 to pulse 12 were utilized. The AUC of the average trace was then calculated for each dose, from the expected start of eCAP activity (<1 meter/s conduction velocity for c-fiber, with 3 to 3.5 mm conduction distance). 0.5 msec biphasic pulses were delivered at 1 Hz for current response curves.

Figure 8A:
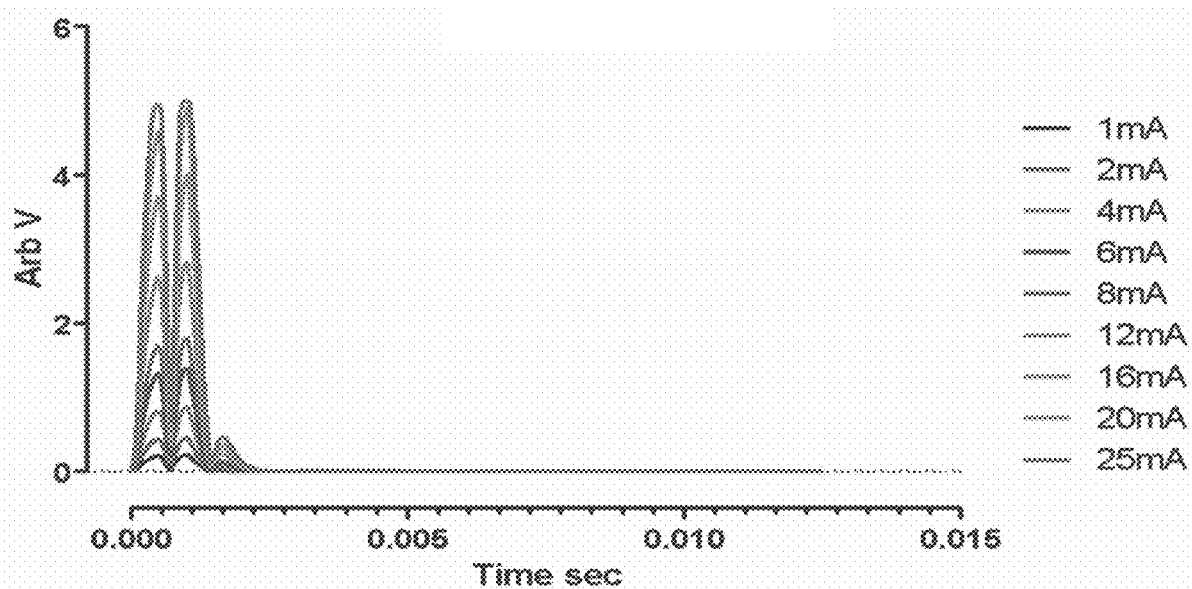
FIG. 8A is an illustration of a rectified shock artefact response curve.
Figure 8B:
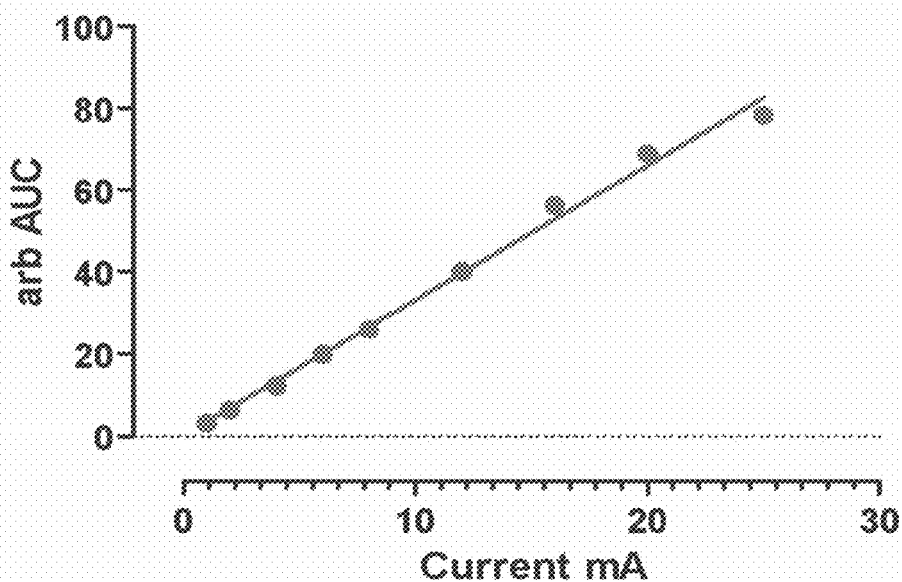
FIG. 8B is an illustration of how shock artefact alone should follow a linear relationship in the absence of eCAP activity.
Figure 9:
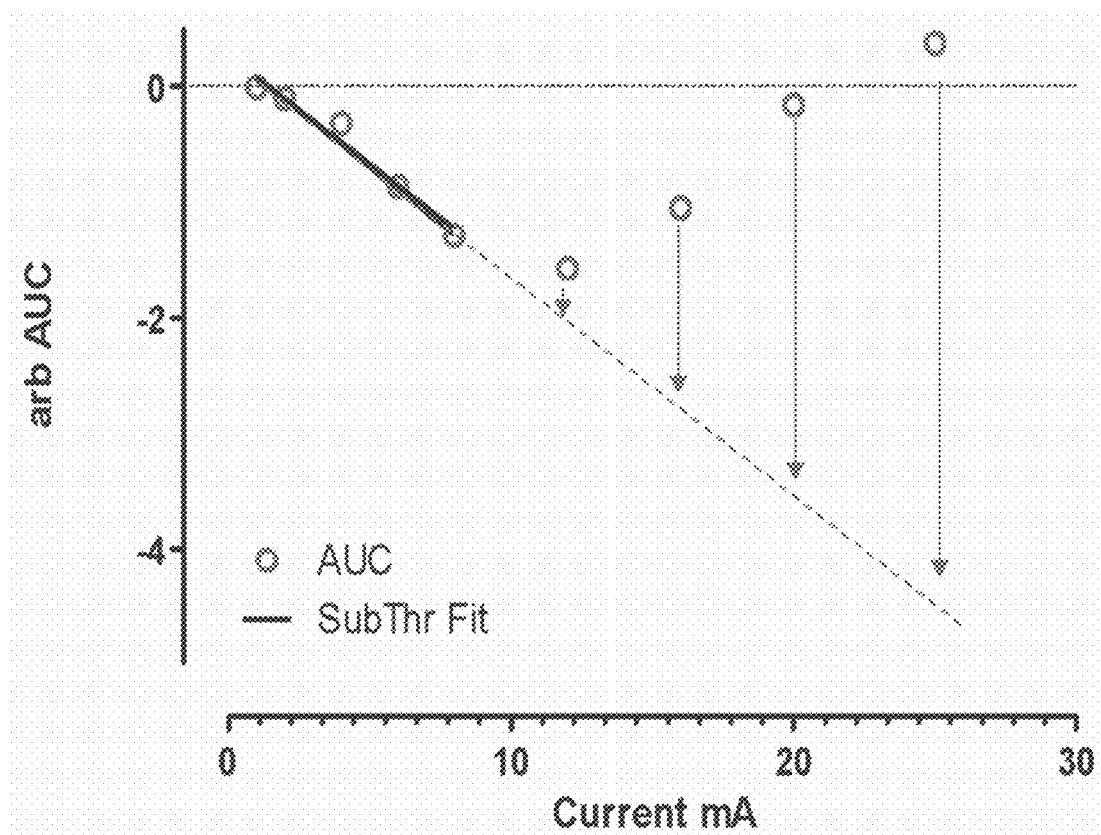
FIG. 9 is an illustration of subthreshold AUC results fit to a linear regression.
Figure 10:
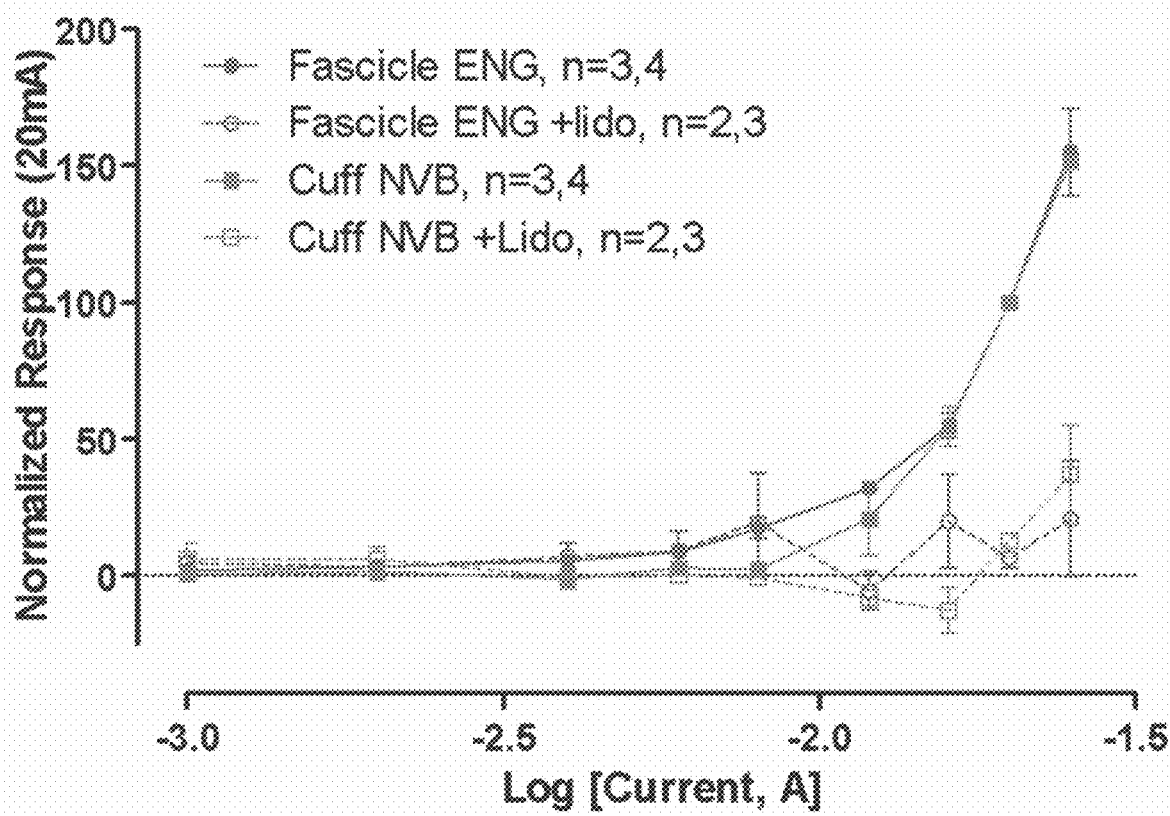
FIG. 10 is an illustration of sensed eCAP activity compared to fascicular eCAP recordings.
Figure 11:
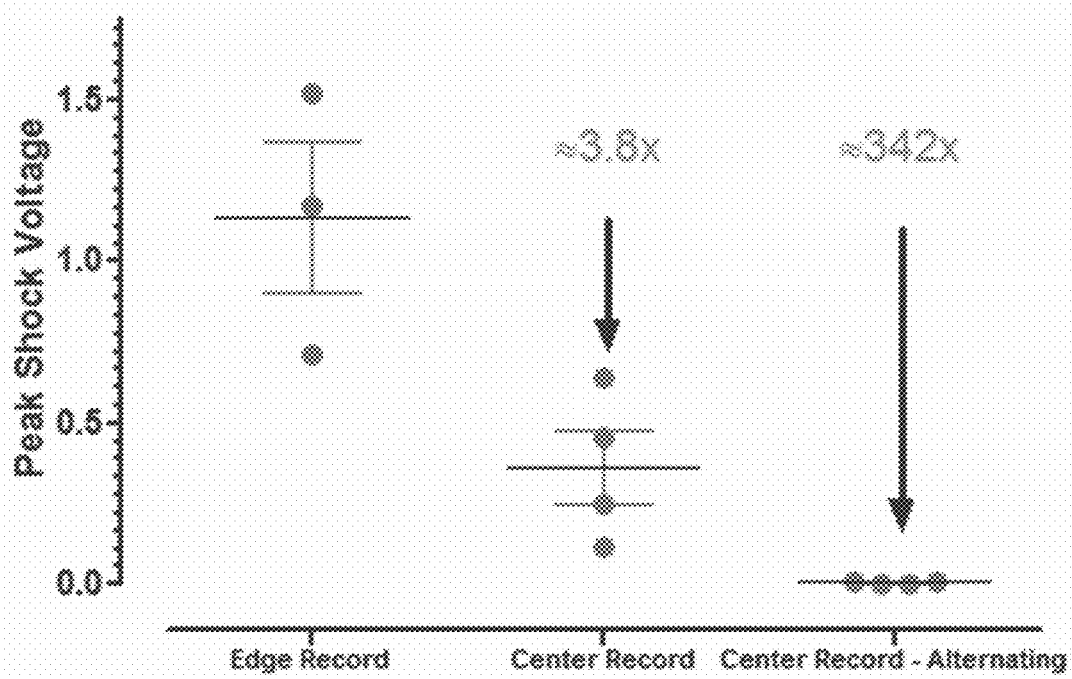
FIG. 11 illustrates a comparison of shock artefact (with 0.5-1 mA pulse, 0.4 ms) based on different recording configurations.

Shock artefact alone should follow a linear relationship, as illustrated in FIG. 8A and FIG. 8B, in the absence of eCAP activity. In FIG. 8A, the curve with the smallest height corresponds to measurements (rectified) from 1 mA, and the curve with the largest height corresponds to measurements (rectified) from 25 mA. Subthreshold AUC results, 1 to 8 mA, may therefore be fit to a linear regression as shown in FIG. 9. Any deviation from this linearity is indicative of eCAP activity. Deviation from the extrapolated subthreshold linear curve for a given current may be calculated and normalized to the subthreshold linear fit slope to allow comparison across experiments. Results may be normalized to 20 mA current response and compared to fascicular eCAP recordings, as illustrated in FIG. 10, which shows deviations from subthreshold linearity containing eCAP content. For shock artefact analysis and effect of stimulation waveform or electrode configuration, peak artefact (max and min) may be calculated from a 10 pulse average trace from 0.5 mA or 1 mA biphasic pulses (0.4 ms). Peak to peak shock artefact and fold benefit may be calculated from these values for a given comparison, as shown in FIG. 11.

Neural interface devices, such as the neural interface 2300 illustrated in FIG. 1, may serve as bioelectrical interfaces for neurovascular bundles. A neurovascular bundle refers to the combination of a blood vessel and the nerves that travel together with that blood vessel. When a neurovascular bundle is neuromodulated, a primary and immediate effect may be activation or inhibition of nerve activity in the neurovascular bundle. Such activity can be measured by sensors in the devices detecting evoked compound activity potentials (eCAPS) that result from the electrical stimulation of the nerves in the neurovascular bundle. Such activity can also result in blood flow changes and changes in the interior and exterior diameter of the blood vessel of the neurovascular bundle, which can also be measured by sensors in the device. In some examples, such as in the neurovascular bundle of the splenic artery, changes in eCAPS and/or blood flow can be used as surrogates to measure neuromodulation effect.

Hence, the present disclosure is also related to embodiments of extravascular neural interface devices containing electrodes for neurostimulation of a target neurovascular bundle, as well as electrodes for monitoring the efficacy of the neurostimulation by detecting the evoked response.

The sensing electrode may be configured to be for impedance measurements, and electromechanical transducers for arterial compliance monitoring, collective referred to herein as "electrically active monitoring devices."

The sensing electrode may also comprise or be replaced by sensors such as a strain sensor or transducer. The sensor may also be piezoelectric stack. Changes in blood flow due to neuromodulation of the neurovascular bundle may be inferred from a combination of the electrically active monitoring devices. For example, voltage may be generated by the piezoelectric stack of the device in response to small deflections in arterial radius. Similarly, changes in differential impedance may be measured by one or more electrodes 420 due to small deflections in arterial radius. The voltage and/or impedance measurements may infer the level of nerve activation due to stimulation of the neurovascular bundle and then used to titrate the neuromodulation effect.

In embodiments, target engagement can also be assessed by measuring the resulting change in impedance due to localized vasoconstriction of the target tissue. For example, assessment of splenic nerve target engagement can be achieved by measuring the resulting change in impedance due to localized vasoconstriction of the splenic artery under the cuff electrodes, which can be used as a surrogate biomarker of activation. Impedance may be used directly by the sensing (or recording) electrode. The sensing electrode may further comprise (or be replaced by) other sensors, such as electromechanical transducer or ultrasound transducers.

For example, measurements may be made by electromechanical transducer to detect one or more of blood flow and blood pressure changes in response to an evoked arterial vasoconstriction caused by neuromodulation of the neurovascular bundle, and wherein the detected one or more of blood flow and blood pressure is used to titrate the electrical dose delivered to the neurovascular bundle to improve therapeutic efficacy. The electromechanical transducer may be further used to detect heart rate from arterial pulsatility in the neurovascular bundle. Where ultrasound transducer is used for a measurement, the sensing electrode may comprise (or be replaced by) two ultrasound transducers and a reflector configured to detect blood flow changes.

Turning again to FIG. 1, an embodiment of a nerve cuff with bipolar stimulation electrodes and integrated sensing elements is illustrated. The cuff 2300 may include a silicone mold with at least three distinct arms in the shape resembling ram horns. A plurality of stimulating electrodes may be placed within the outside arms E1 and E2, respectively. A plurality of sensing electrodes may also be placed symmetrically about the center arm ED to neuromodulate the neurovascular bundle. A plurality of sensing or stimulating electrodes may also be formed in the center arm ED to measure evoked compound action potentials (eCAP) and one or more sensors may be formed in the middle arm ED to detect evoked physiological changes. The sensing electrodes and sensors may be referred to collectively as electrically active monitoring devices. A connecting lead may be configured to provide power and control signals to the plurality of stimulating electrodes and the electrically active monitoring devices or sensing electrodes.

Figure 13:
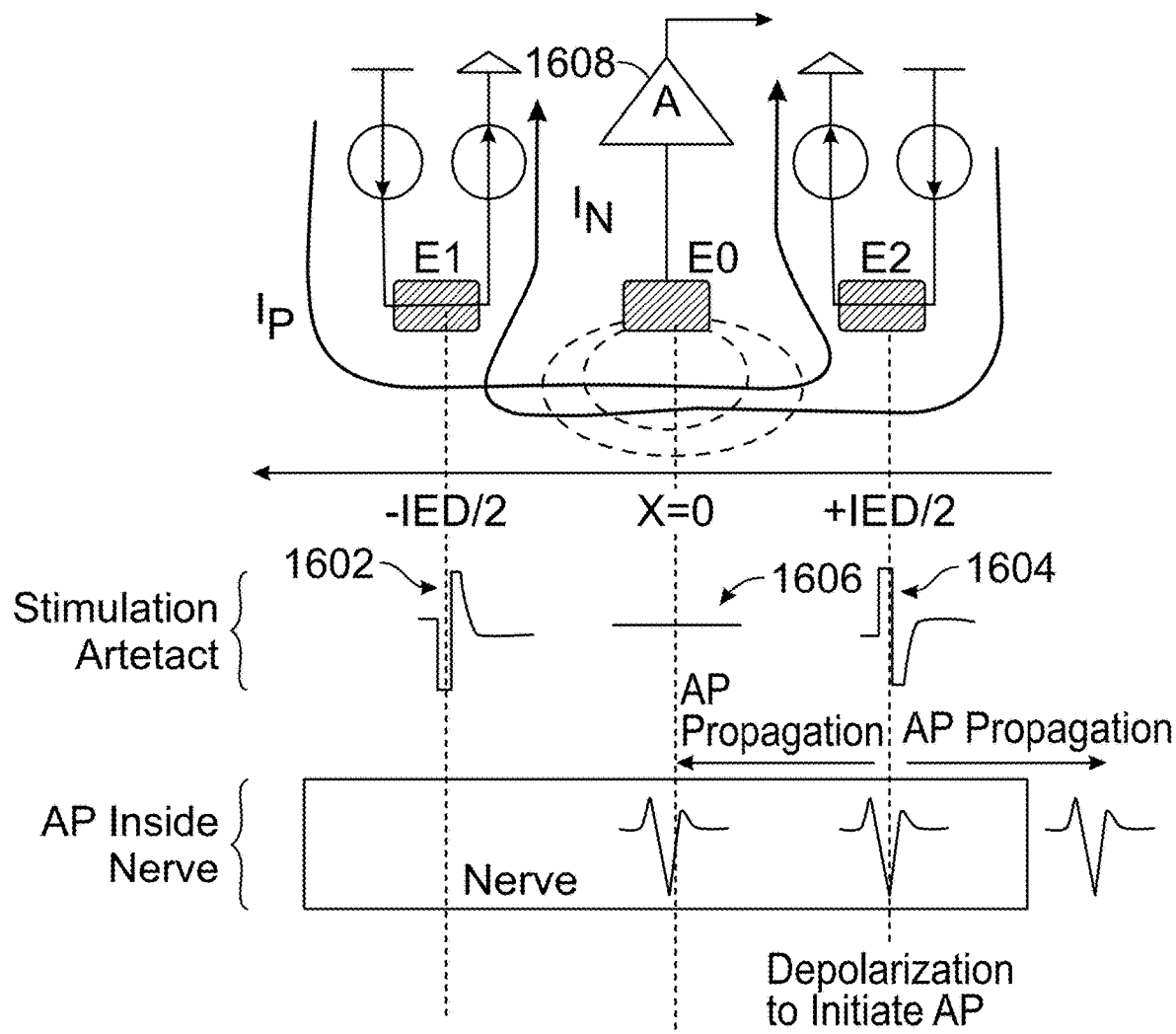
FIG. 13 is an illustration of artefact cancelation for improved eCAP measurement by a nerve cuff in accordance with an embodiment.

Operation of a neuromodulation device for monitoring is further illustrated with references to FIGS. 13-19. FIG. 13 illustrates how a neuromodulation device having two outer active electrodes E1 and E2 and a central active electrode E0 may be used to cancel artefacts created during stimulation in order to improve eCAP measurements. The one or more electrodes may be interconnected and placed in the middle and symmetric with respect to the two stimulating electrodes E1 and E2 which are driven in a bipolar alternating configuration. As shown, stimulation artefacts 1602 and 1604 produced by the stimulating electrodes E1 and E2 add destructively to cancel 1606 in the middle electrode E0 thereby improving the signal to noise ratio of the propagated activity potential inside the nerve bundle produced by the stimulating cathode electrode. The detection may be further improved by alternating the cathode between electrode E1 and electrode E2 and averaging the trigger aligned output of electrode E0. The detection may also be improved by blanking the amplification circuit 1608 during the active phase of the stimulation pulse.

Figure 14:
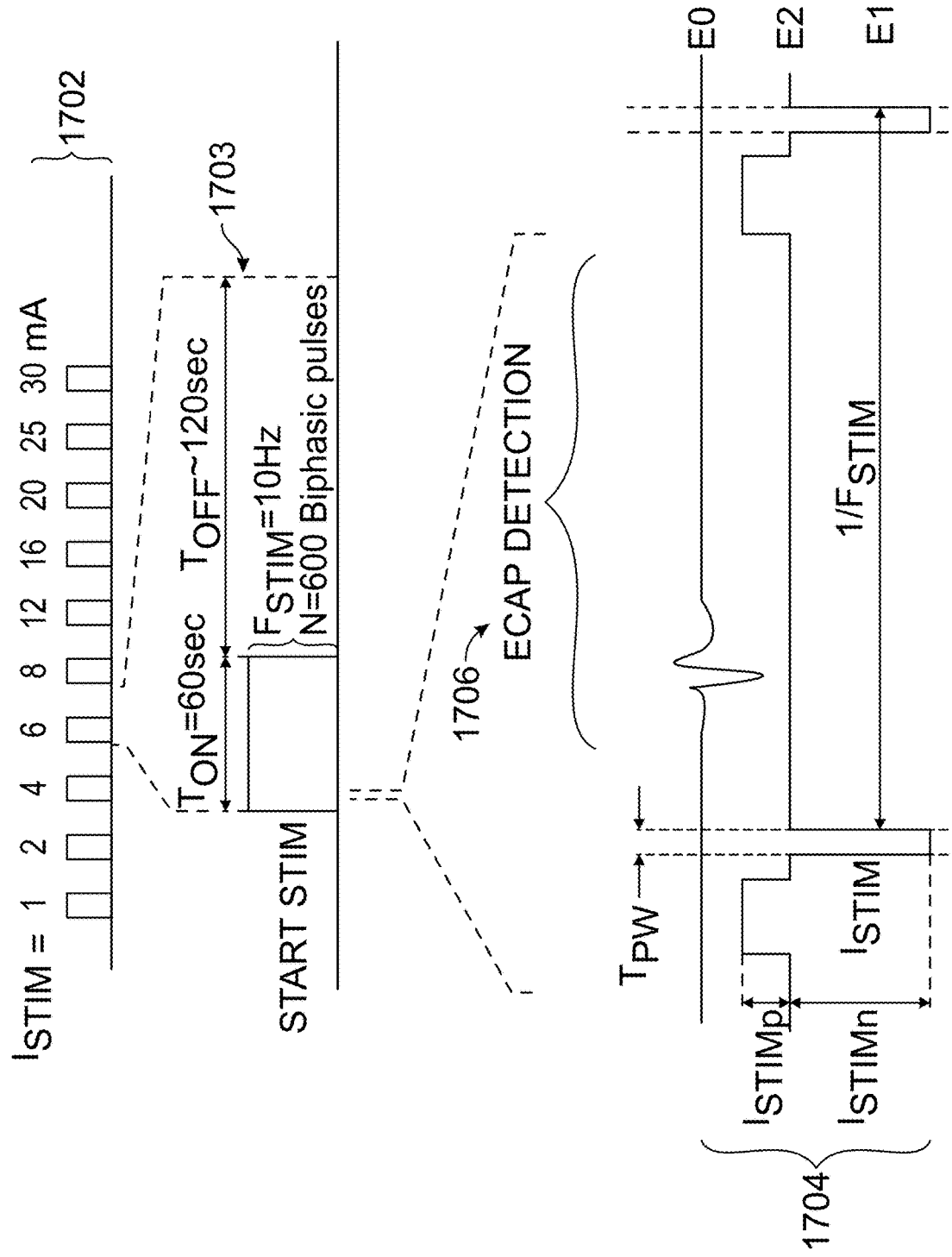
FIG. 14 is an illustration of dose response via eCAP measurement by a nerve cuff in accordance with an embodiment.

As illustrated in FIG. 14 the measurement of an electrical dose-response comprises measuring a response with center electrode E0 to a sequence of electrical pulses 1702 (shown at the top of FIG. 14) of increasing charge applied in a fixed intermitted manner consisting of ON and OFF phases, wherein the ON phase may comprise of a fixed number of stimulation pulses at a fixed stimulation frequency and wherein the OFF phase may consist of no stimulation pulses for a fixed duration or a sequence of subthreshold pulses known not to cause a physiological response which allows the nerve bundle to return to a baseline. As shown in FIG. 14, a stimulation period 1703 between pulse 6 and 8 of pulses 1702 is further illustrated. Stimulation is turned ON for 60 seconds and then turned OFF (or down) for 120 seconds, a portion of which is illustrated in the frequency response graph 1704 and which results in eCAP being detected 1706 and therefore measured.

The electrodes in the middle electrode may be used to detect the eCAP resulting from an electrical dose delivered using the stimulating electrodes E1 and E2, which applied therapeutic electrical dose may be a measure of nerve target engagement. A number of techniques may be used to improve the accuracy of measurements. For example, the eCAP response resulting from the ON phases can be averaged to improve the accuracy of the measurement. The averaged rectified area of the eCAP may be used to improve the accuracy of the measurement. The averaged peak-to-peak metric may be used to improve the accuracy of the measurement. The negative or positive peak amplitudes may be used to improve the accuracy of the measurement.

Figure 15:
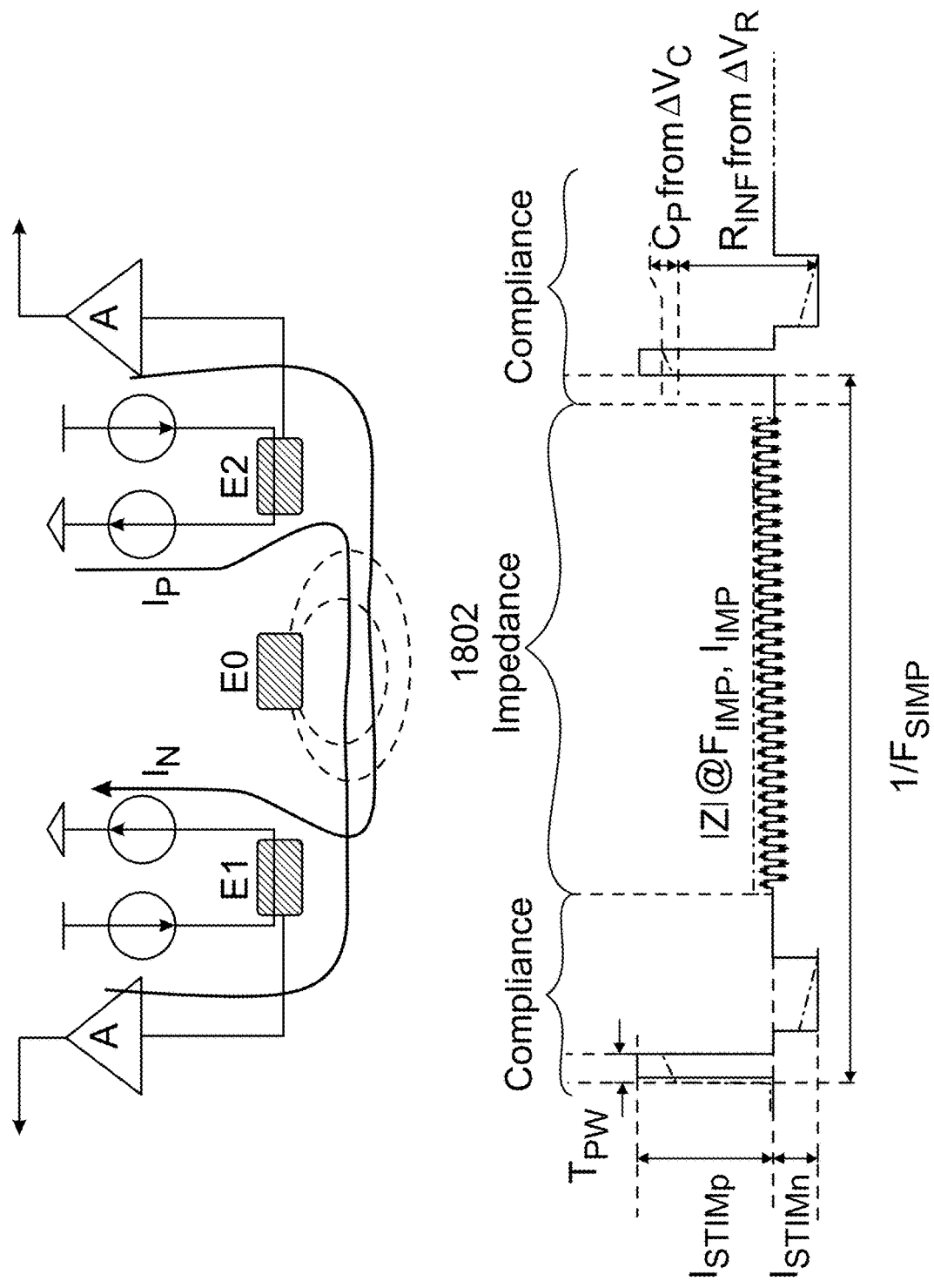
FIG. 15 is an illustration of dose response via impedance measurement by a nerve cuff in accordance with an embodiment.

As further illustrated in FIG. 15, which illustrates dose response via impedance measurements, real-time change in impedance seen across the stimulating electrodes E1 and E2 may be used to assess the dose response. The impedance change 1802 caused by the electrical dose may be measured by extracting the real-time change in access resistance and polarization capacitance directly from compliance voltages across electrodes E1 and E2 during the stimulation pulse. As illustrated, the impedance change caused by an applied electrical dose may be measured by detecting the impedance of a subthreshold signal injected between the stimulation pulses across stimulating electrodes E1 and E2. A measurement may be taken before a stimulation pulse and after the stimulation pulse, to determine the change in impedance before and after the stimulation pulse.

Figure 16:
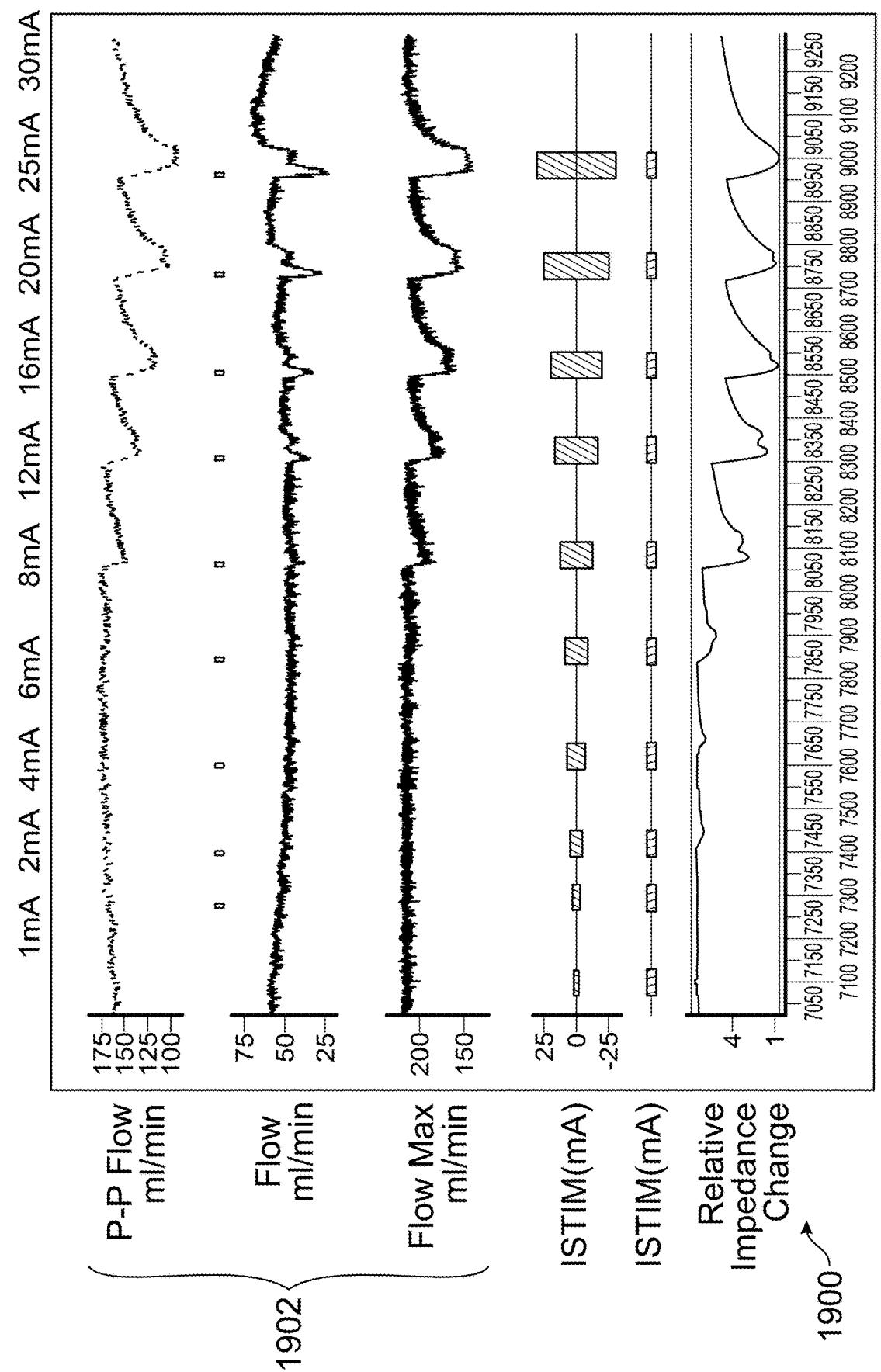
FIG. 16 is an illustration of real-time impedance measurements in accordance with an embodiment.

As illustrated in FIG. 16, does response may be determined by measuring real-time impedance measurements 1900. The changes in impedance may be correlated to changes in arterial blood flow 1902 during the applied dose. The changes in impedance may also be correlated to changes in blood pressure during the applied dose. The changes in impedance may also be correlated to changes in heart-rate during the applied dose. The changes in impedance may also be correlated to changes in respiratory rate during the applied dose.

Figure 17:
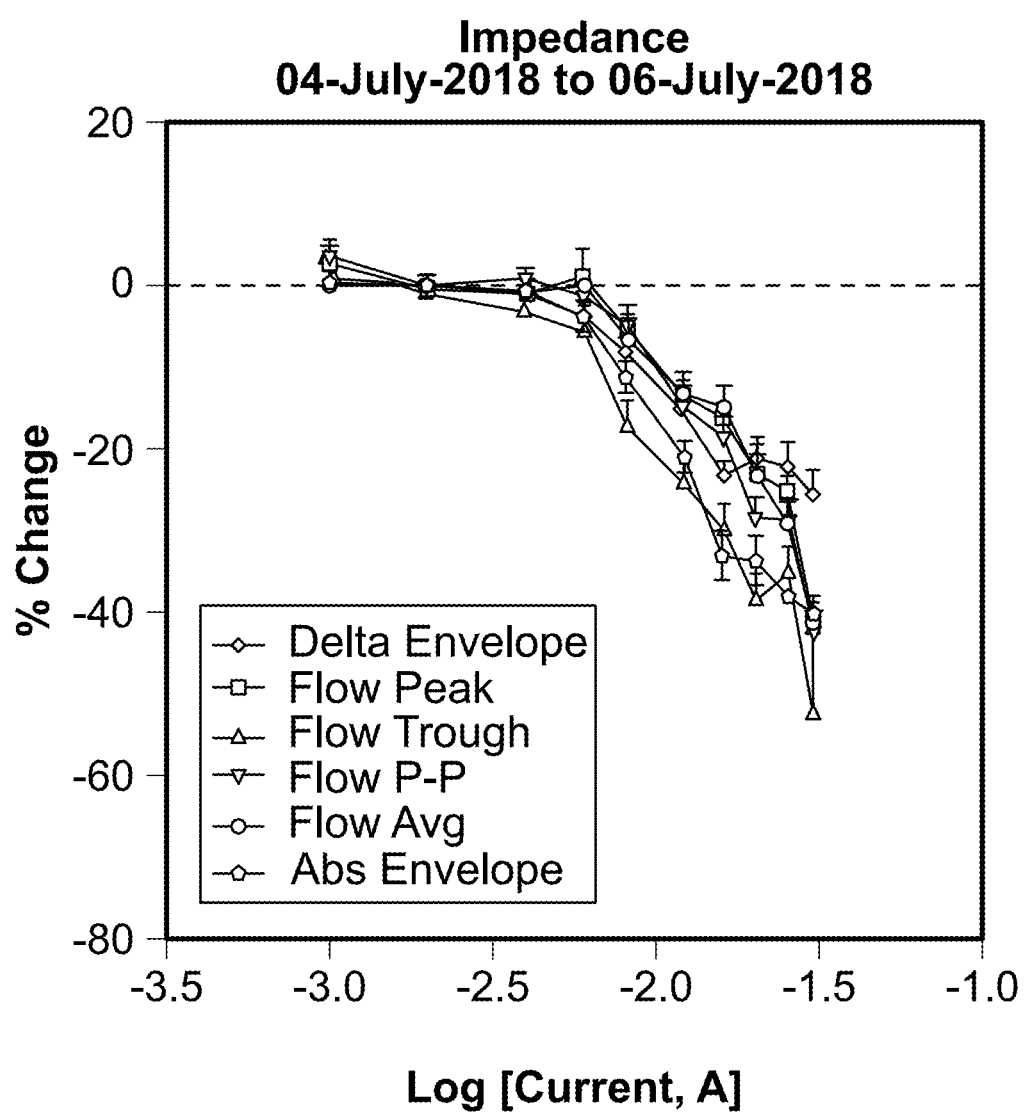
FIG. 17 is an illustration of impedance, compliance (which may also be referred to access resistance), eCAP responses and flow (where there is blood pressure) to an applied dose in accordance with an embodiment.
Figure 17:
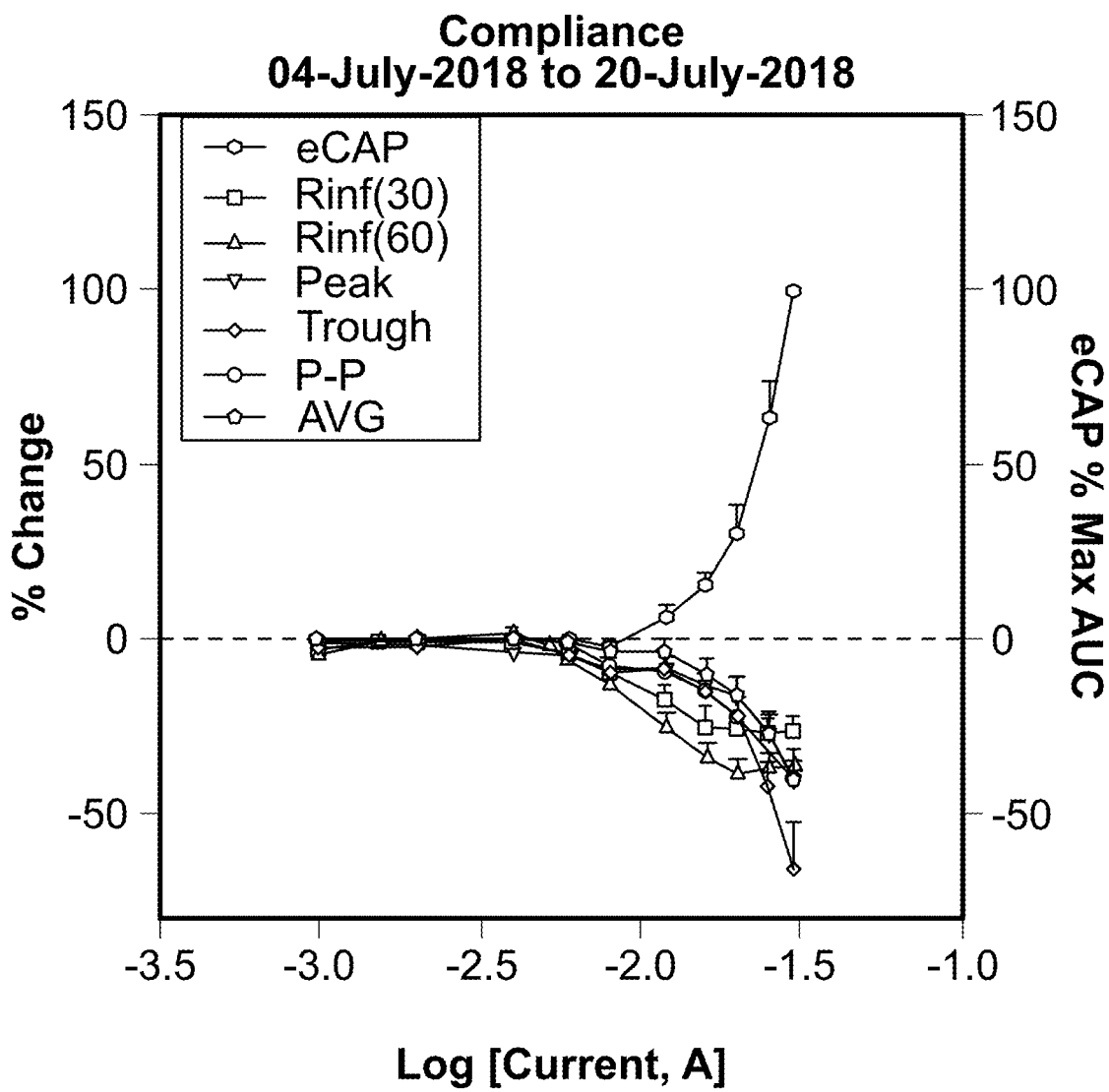

FIG. 17 is an illustration of impedance, compliance/access resistance, splenic blood flow and eCAP responses to an applied dose in accordance with an embodiment. As illustrated, dose response may be determined from the real-time change in eCAP. The changes in impedance may be correlated to changes in arterial blood flow changes during the applied dose. The changes in eCAP may be correlated to changes in blood pressure during the applied dose. The changes in eCAP may be correlated to changes in heart-rate during the applied dose. The changes in eCAP may be correlated to changes in respiratory rate during the applied dose. Dose response using impedance or eCAP measurements may be correlated to changes in blood flow, blood pressure, heart rate, respiratory rate, or other physiological variables. Such correlation may be deterministic and repeatable to assess the effectiveness of the electrical neuromodulation. The measurement may be used to titrate therapy over time. The measurement may be used as a diagnostic chronic tool. The measurement may be used to assess intraoperative effectiveness of the electrical neuromodulation.

Figure 18:
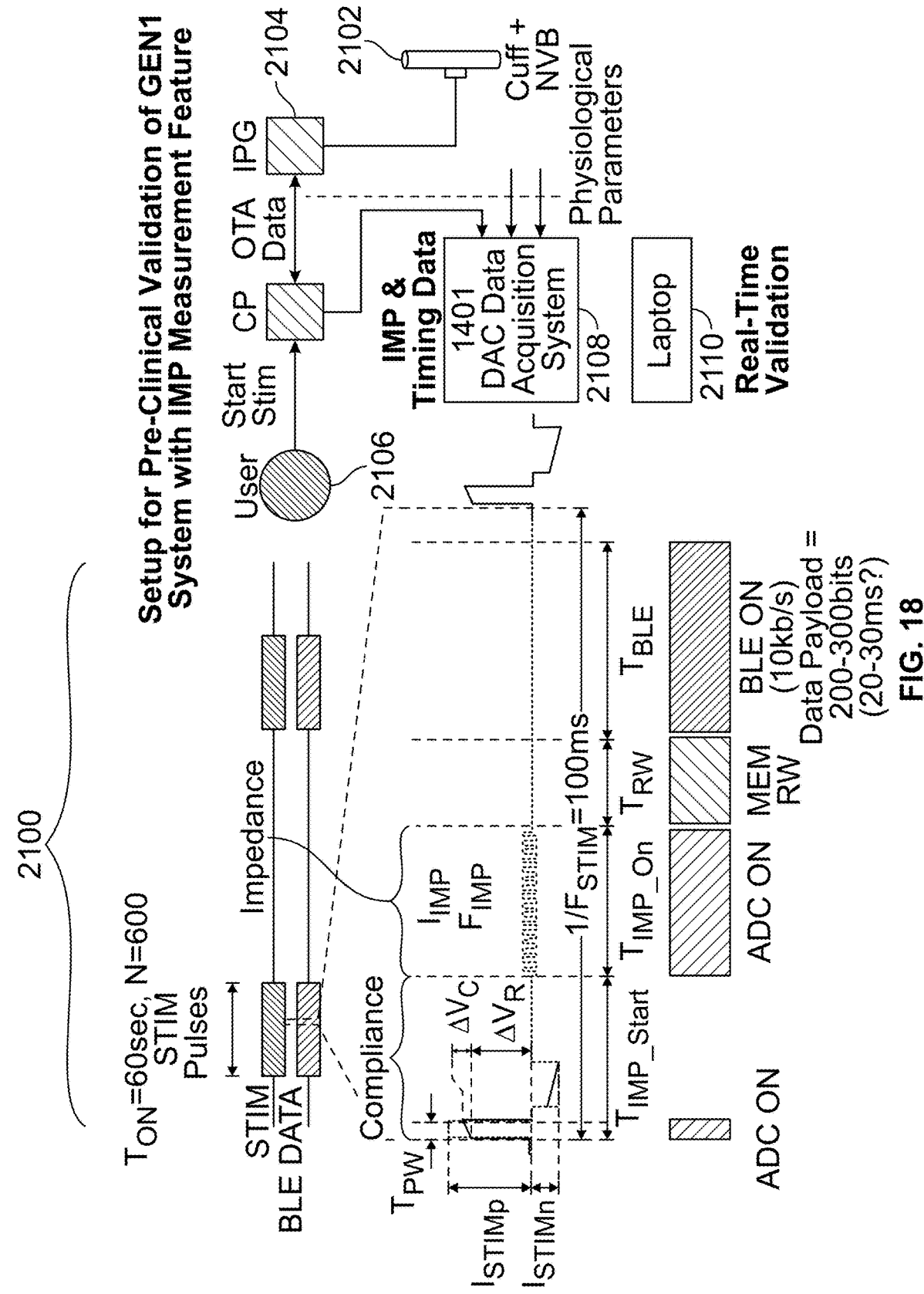
FIG. 18 is an illustration of real-time data streaming and systems operation in accordance with an embodiment.

FIG. 18 is an illustration of real-time data streaming and systems operation in accordance with an embodiment. The real-time dose response measurements 2100 produced by cuff 2102 may be transmitted to a patient operated device or clinician programmer using the implantable pulse generator (IPG) 2104 using the over-the-air (OTA) data transmission protocol to a clinician or patient programmer, the user 2106, and converted to digital data by DAC 2108 and stored and manipulated on a laptop 2110. The data may be transmitted in real-time as requested by the external clinician or patient programmers 2106.

Figure 19:
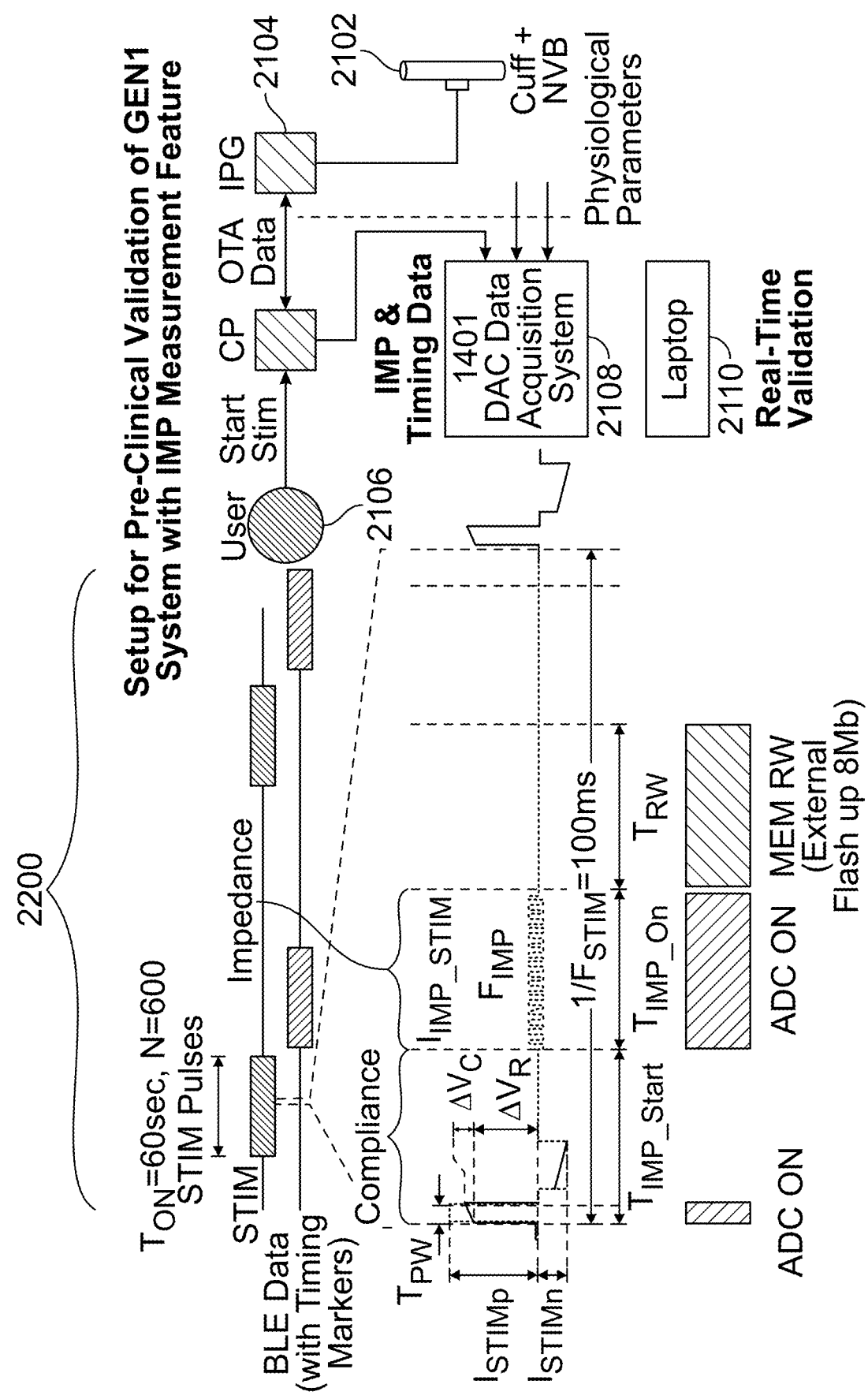
FIG. 19 is an illustration of data logging and systems operation in accordance with an embodiment.

FIG. 19 is an illustration of data logging and systems operation in accordance with an embodiment. The real-time dose response measurements 2200 may be transmitted to a patient operated device or clinician programmer 2106 using the implantable pulse generator (IPG) over-the-air (OTA) data transmission protocol. The data may be stored in local IPG 2104 memory and transmitted as requested by the clinician and patient programmers. The data collected over the lifetime of the patient implant may be used to analyze effectiveness of the neuromodulation system. The data collected over the lifetime of the patient implant may be aggregated with anonymized data from patient populations to understand disease progression over time.

In addition to or as an alternative to the above, following embodiments are described. The features described in any of the following examples may be utilized with any of the other embodiments described herein.

A neuromodulation device for measuring an evoked response, the device comprising:
  a first electrode;
  a second electrode, wherein the first and second electrodes are alternately configured as a stimulation electrode;
  a sensing electrode for sensing an evoked response to a stimulus pulse; and
  a controller configured to measure an evoked response at the sensing electrode after a stimulus pulse (is applied) at a first stimulation electrode configuration and after a stimulus pulse (is applied) at a second alternate stimulation electrode configuration, and to add or average said pair of measurements.

A stimulation electrode may also be referred to as a cathode. Similarly, a source electrode may also be referred to as an anode. A sensing electrode may be also be referred to as a recording electrode.

An electrode may be configured to be a stimulating electrode, a sensing electrode or a source electrode depending on how it is driven by the controller.

As the first and second electrodes may be alternately configured as a stimulation electrode, the stimulus pulse at a first stimulation electrode configuration where the first electrode is the stimulation electrode, and the stimulus pulse at a second alternate stimulation electrode configuration where the second electrode is the stimulation electrode may have opposite polarity.

The controller may be configured to add the measurements in a time synchronized manner. For example, each measurement may be taken after a predetermined time (e.g. $t_{RESET}$ delay) after a stimulus pulse edge. For example, each measurement may be indexed the relevantly indexed pair (measurements taken after opposite polarity stimulus pulse) may be added together.

The stimulus pulse may be biphasic, and said biphasic pulse may be symmetric or asymmetric.

The controller may be configured to consecutively alternate the stimulation electrode configuration, thereby alternating a stimulus polarity of consecutive biphasic stimulus pulses. In other words, sequence order of stimulus polarity of consecutive stimulus pulses are alternated.

The stimulation electrode configuration may be alternated after a series of stimulus pulse (also referred to as stimulation pulse) with the same polarity is provided. In other words, a series (or a set) of the same polarity pulses may be provided by configuring the first and second electrodes in the same configuration. However, in this case, a same number of series of stimulus pulse in the opposing polarity may be provided. Alternatively, where the number of series of stimulus pulse is not the same, at least pairs of measurements from opposing polarity may be used when adding up. The series of stimulus pulses may be at a single amplitude of current. In other words, a pair of measurements for each stimulus pulse of the alternate configurations are taken and add up said measurements.

The device may comprise a source electrode, wherein the first and second electrodes may be alternately configured as the source electrode, further wherein the first electrode is configured as the stimulation electrode when the second electrode is configured as the source electrode, and the first electrode is configured as the source electrode and the second electrode is configured as the stimulation electrode.

The device may comprise a third electrode, wherein the third electrode is configured as the sensing electrode or a source electrode. The third electrode may be located between the first and second electrodes. For example, the first electrode may be a stimulating electrode and the second electrode may be a source electrode, when the third electrode between the first and second electrodes is a sensing electrode. To change the polarity of the stimulus pulse, the first electrode may then be a source electrode and the second electrode may be a stimulating electrode, when the third electrode between the first and second electrodes is a sensing electrode. Thus, the first and second electrodes are driven in bipolar alternating configuration. This may be referred to as "central recording", where the neural interface comprises at least three electrodes. Alternatively, the first electrode may be the stimulating electrode and the third electrode between the first and second electrodes may be a source electrode, where the second electrode is the sensing electrode. To change the polarity of the stimulus pulse, the second electrode may be the stimulating electrode and the third electrode between the first and second electrodes may be the source electrode, where the first electrode is the sensing electrode. This may be referred to as "edge recording".

Where at least three electrodes are provided at a neural interface, a fourth electrode may be provided, where the fourth electrode is a titanium metal housing of an implantable pulse generator connected to the first, second and third electrodes. In this case, the stimulation electrode may alternate between the first and second electrode, with the third electrode being the sensing electrode, where the fourth electrode acts as a source electrode.

In some embodiments, only two electrodes may be provided at a neural interface. In this case, a third electrode may be a metal housing of an implantable pulse generator connected to the first and second electrodes. In this case, the first electrode may be the stimulating electrode and the third electrode (metal housing of an implantable pulse generator) may be the source electrode, where the second electrode is the sensing electrode. To alternate the polarity of the stimulus pulse, the second electrode may then become the stimulating electrode and the third electrode (metal housing of an implantable pulse generator) may be the source electrode, where the first electrode is the sensing electrode.

The controller may be configured to drive the first and second electrodes in a bipolar alternating configuration.

Alternating electrode configuration may result in alternating stimulus pulse polarity.

The above mentioned various combinations of electrode arrangements enable at least a monopolar (or pseudo bipolar) configuration or bipolar configuration.

The controller may be configured to add up the measurements taken after a number of alternating pulses at a single amplitude. The amplitude of the pulse may refer to the amplitude of the current.

Where there are at least three electrodes in the neural interface, the third electrode may be between the first and second electrodes. The first and second electrodes may each be equidistant to the third electrode.

The controller may be a microprocessor, or a plurality of microprocessors.

The sensing electrode may be configured to measure voltage after each stimulus pulse. In other words, a voltage measurement may be taken from the sensing electrode after each stimulus pulse.

In other words, the sensing electrode may be configured to measure evoked compound action potentials (eCAP) by measuring the voltage change at the sensing electrode. The voltage change may be affected by various factors as discussed above, which means that the eCAP measurement is difficult to discern from the stimulation artefact which also affects the voltage measurement. Thus, the voltage measured is a combination of contribution by stimulation artefact and an actual eCAPs response (when the amplitude of the pulse is above a threshold for stimulating an action potential).

The controller may be configured to add up the measurements taken after a number of alternating pulses, such that the stimulation artefact in the measured voltage add up destructively and the eCAP response in the measured voltage add up constructively.

Taking a running average means that it is not necessary to store the entire sequence of measurements in the device.

The controller may be configured to take a running average, for each fixed amplitude, of measurements taken at the sensor electrode during a ramp up process in which a sequence of alternating stimulation pulses are ramped from a lower amplitude to a higher amplitude. The amplitude may refer to amplitude of the current of the stimulus pulse.

A running average is taken for each fixed amplitude. Thus, a measurement in response to a number of pulses for each amplitude may be taken, for example "n" consecutive pulses of equal amplitude.

The lower amplitude may be substantially zero, and the higher amplitude may be a desired amplitude dose.

During an initial phase of the ramp up (e.g. from zero to a threshold amplitude at which an eCAP response is achieved, i.e. action potential is evoked), a linear progression of artefact measurements (which is based on the actual voltage measurements during the initial phase where the amplitude of the stimulus pulse is below the threshold amplitude, in other words, the linear progression is based on the running average values during the initial phase of ramp up) may be obtained, and based on the linear progression a projection of a predicted artefact (or a predicted artefact contribution in the measured voltage) is determined.

Rectified may refer to using modulus function.

When combining various options for reducing noise as described herein (for example, taking measurements from alternating polarity biphasic pulses and adding; spatial arrangement between stimulation electrodes and sensing electrode; using predicted artefact contribution determined during ramp up for determining eCAP response), it is assumed that the artefact is still present despite another option having been used. For example, the predicted artefact contribution determined during ramp up for determining eCAP response option may be used in addition to alternating polarity pulses based on the assumption that the alternating polarity pulses and adding has not removed all artefact and that stimulation artefact is still present despite the cancellation by alternating polarity pulses option. If there is no artefact after use of just one of the options, the eCAP response can be measured relatively easily without further artefact removal. For example, area under the curve is being used as a part of the classifier with the assumption that the artefact remains a significant contributor. In case where artefact is significantly removed after use of just one of the options, other methods such as peak detection (peak modulus) and magnitude based algorithms can be used to measure the eCAP response. In other words, if an area under the curve is considered as a metric that is used by the classifier, other metrics such as peak to peak can be used depending on the signal to noise ratio (e.g. if the signal to noise ratio is already relatively low after using a single option).

The number of measurements may be taken at each amplitude during the ramp up and an average measurement value may be used for each amplitude. In other words, the above mentioned running average value for each amplitude may be used.

During the final phase of the ramp up at the desired amplitude dose, a difference between the predicted artefact for the desired amplitude dose and an actual measurement for the desired amplitude dose may be used to determine an eCAP dose response.

As before, the actual measurement may refer to an average actual measurement value at the final amplitude dose.

The differences between the predicted artefact and an actual measurement may be taken at any later phase of the ramp up. A minimum initial phase may be determined as when a linear progression projection is possible. It is noted that taking values until linear progression projection is available (i.e. up to a point of inflection where eCAP response starts to affect the measurements such that the measurement is no longer mostly stimulation artefact. For example, the initial phase may refer to stimulation currents 0-10 mA as can be seen in FIG. 6.

In other words, a eCAP dose response is determined by looking at an actual measurement (or actual voltage measurement, or an average of actual voltage measurements at a single current amplitude during ramp up) and taking away from the measurement the predicted contribution of stimulation artefact.

The sensing electrode (ED) may be coupled to an input reset amplifier that is configured in a reset state until $t_{RESET}$ delay after a transition edge of the stimulus pulse, wherein the input reset amplifier measurement is enabled for a fixed record length of $t_{RECORD}$, wherein the $t_{RESET}$ and $t_{RECORD}$ are programmable by the control unit.

The $t_{RESET}$ delay may be determined based on a propagation velocity of target fiber type and the distance between the sensing electrode and the first electrode or distance between the sensing electrode and the second electrode.

The $t_{RECORD}$ may be determined based on the average action potential pulse.

Figure 7A:
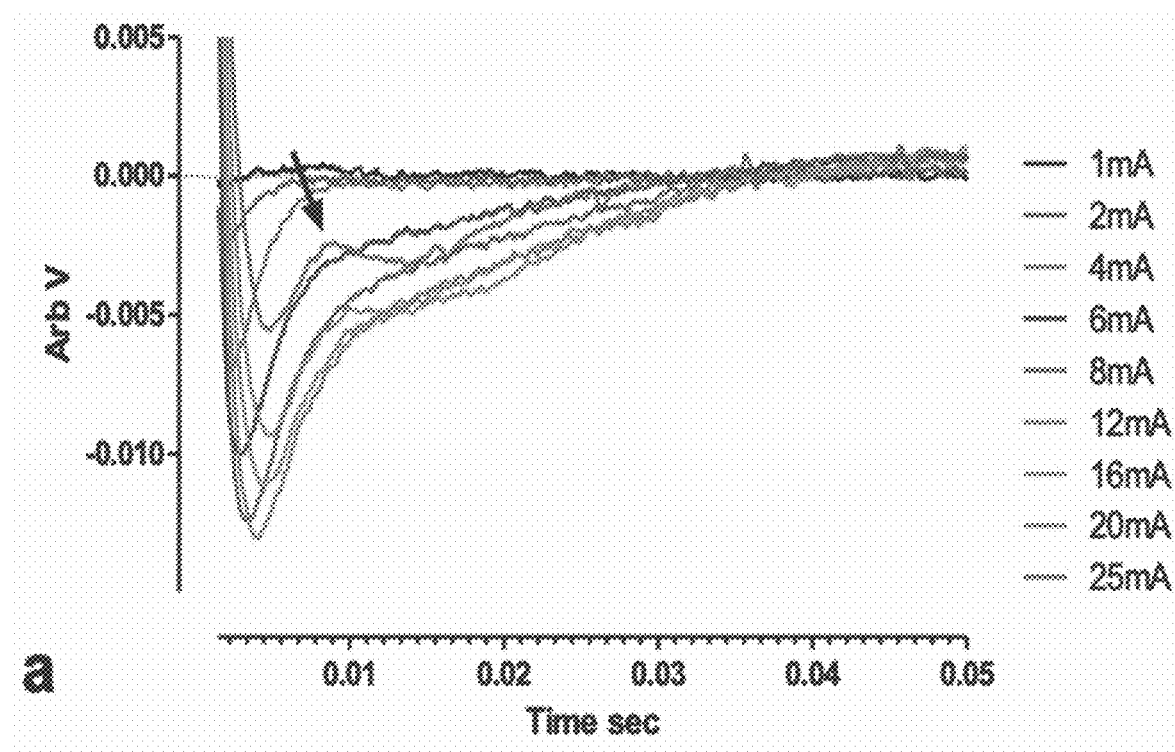
FIG. 7A is an illustration of the measured eCAP response with artefact cancellation and averaging.
Figure 7B:
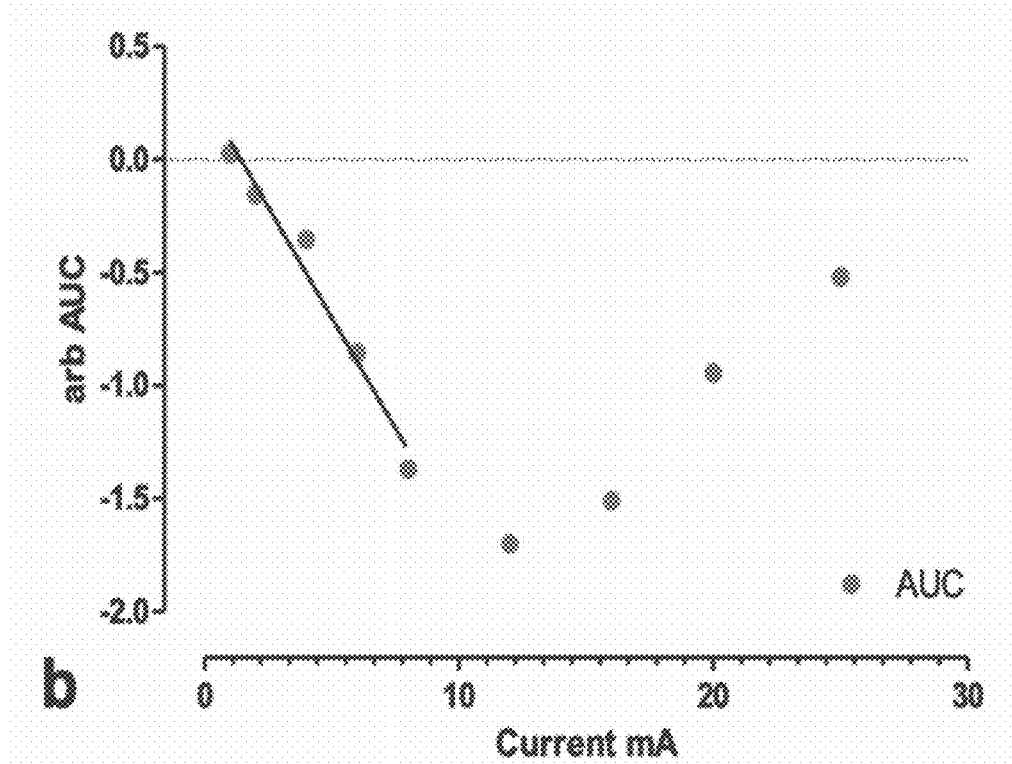
FIG. 7B is an illustration of AUC (area under the curve) eCAP current response.

The output of the reset amplifier may be sampled, quantized, filtered and windowed by a digital processor, wherein the output is then averaged across $t_{RECORD}$ length, The averaged output may be further processed to compute the area under the curve (AUC) or integral of the neural responses across 'm' measurement cycles The area under the curve refers to measurement curve measuring the voltage, for example those shown in FIG. 7A. The inflection on the red-line (25 mA) which the arrow points to corresponds to 0.3 m per second conduction velocity, which corresponds to the c-fibre velocity, such that we know that this is due to eCAP response. An averaged output for each amplitude is shown as dots in FIG. 7B.

An eCAP signal classifier may be used to compute a linear projection of the artefact AUC resulting from a sequence of stimulation pulses ramped from zero amplitude to the desired amplitude dose The eCAP signal classifier may be configured to compute the projection of the maximal dose rAUC onto the estimated artefact rAUC as the Euclidean distance measure for detecting an eCAP dose response The first electrode, the sensing electrode and the second electrodes may be provided in a neural cuff, deployable about a target, comprising at least three distinct arms connected to a spine, wherein the first and second electrodes are located on outer arms and the sensing electrode is located on a center arm, which is between the outer arms.

The measured eCAP signal may be used to determine dose response, and/or disease progression.

The first electrode referred to above may be formed of a plurality of first electrodes. The second electrode referred to above may be formed of a plurality of second electrodes. The third electrode referred to above may be formed of a plurality of third electrodes. Similarly, the sensing electrode may be formed of a plurality of sensing electrodes.

The sensing electrode may comprise or be replaced with an electromechanical transducer to detect one or more of blood flow and blood pressure changes in response to an evoked arterial vasoconstriction caused by neuromodulation of the neurovascular bundle, and wherein the detected one or more of blood flow and blood pressure is used to titrate the electrical dose delivered to the neurovascular bundle to improve therapeutic efficacy.

The electromechanical transducer may further used to detect heart rate from arterial pulsatility in the neurovascular bundle.

The sensing electrode may comprise or be replaced with two ultrasound transducers and a reflector configured to detect blood flow changes.

The sensing electrode in a middle arm may be interconnected and positioned symmetric with respect to the plurality of stimulating electrodes in the outer arms, and wherein the plurality of stimulating electrodes are driven in a bipolar alternating configuration.

A stimulation artefact produced by one or more of the plurality of stimulating electrodes may add destructively to cancel other stimulation artefacts at the sensing electrode in the middle arm thereby improving a signal to noise ratio of the eCAP response produced by a stimulating cathode electrode among the plurality of stimulating electrodes, and wherein eCAP response detection is further improved by one or more of: (a) alternating the stimulating cathode electrode between the plurality of stimulating electrodes in the outer arms (E1 and E2) and averaging an output of the plurality of electrically active monitoring devices in the middle arm (ED), and (b) blanking an amplification circuit during an active phase of a stimulation pulse.

Measurement of an electrical dose-response may comprise a response to a sequence of electrical pulses of increasing charge applied in a fixed intermitted manner consisting of ON and OFF phases, wherein the ON phase may comprise of a fixed number of stimulation pulses at a fixed stimulation frequency, wherein the OFF phase may consist of no stimulation pulses for a fixed duration or a sequence of subthreshold pulses known not to cause a physiological response which allows the neurovascular bundle to return to a baseline.

The plurality of electrically active monitoring devices may measure eCAP response produced by a stimulating cathode electrode among the plurality of stimulating electrodes resulting from the electrical dose, wherein the eCAP response to the applied therapeutic electrical dose is a measure of neurovascular bundle engagement.

An accuracy of the measurement of the eCAP response resulting from the ON phases may be improved by one or more of: (a) averaging the measurement of each of the plurality of electrically active monitoring devices, (b) averaging a rectified area of the eCAP response, (c) averaging a peak-to-peak metric, and (d) using negative or positive peak amplitudes.

A real-time change in impedance may be measured across the plurality of stimulating electrodes is used to assess a dose response.

A real-time change in impedance may be measured across the sensing electrode is used to assess a dose response.

An impedance measurement may be taken before a stimulation pulse and an impedance measurement is taken after a stimulation pulse.

Thus a change in the impedance measurement before and after a stimulation pulse can be used to determine a dose response.

The impedance change may be measured by extracting real-time change in access resistance and polarization capacitance directly from compliance voltage across the plurality of stimulating electrodes during the stimulation pulse.

The impedance change may be measured by detecting the impedance of a subthreshold signal injected between stimulation pulses across the plurality of stimulating electrodes.

The dose response may be determined from real-time change in impedance, wherein the changes in impedance are correlated to changes in arterial blood flow changes during an applied dose, wherein the changes in impedance are correlated to changes in blood pressure during the applied dose, wherein the changes in impedance are correlated to changes in heart-rate during the applied dose, and wherein changes in impedance are correlated to changes in respiratory rate during the applied dose.

A system for stimulation of a nerve and for monitoring stimulation dose response based on impedance may comprise: a neural interface device comprising a plurality of electrodes for electrically contacting the nerve; a voltage or current source operatively connected to at least a subset of the electrodes, wherein the voltage or current source is configured to generate an electrical signal to be applied to the electrodes; an impedance measuring module operatively connected to at least a subset of the electrodes, wherein the impedance measurement module is configured to measure impedance between the electrodes; and a controller arranged to determine a dose response induced by the electrical signal based on the measured impedance and to adjust the electrical signal in order to induce a target dose response. The impedance measurement module may be configured to measure impedance between the electrodes before an electrical signal and after the electrical signal.

The dose response may be determined from a real-time change in the eCAP response, wherein dose response is determined from real-time change in impedance measured across the plurality of stimulating electrodes, wherein the changes in impedance are correlated to changes in arterial blood flow changes during the applied dose, wherein the changes in the eCAP response are correlated to changes in blood pressure during the applied dose, wherein the changes in the eCAP response are correlated to changes in heart-rate during the applied dose, and wherein changes in the eCAP are correlated to changes in respiratory rate during the applied dose.

Dose response using impedance or eCAP response measurements may be correlated to changes in blood flow, blood pressure, heart rate, respiratory rate, or other physiological variable, wherein the correlation is deterministic and repeatable to assess an effectiveness of electrical neuromodulation, wherein the measurements are used to titrate therapy over time, wherein the measurements are used as a diagnostic chronic tool, and wherein the measurements are used to assess an intraoperative effectiveness of electrical neuromodulation.

The measurements may be transmitted to a patient operated device or clinician programmer using an implantable pulse generator (IPG) using an over-the-air (OTA) data transmission protocol, and wherein the measurements are transmitted in real-time as requested by the patient operated device or patient programmer.

The measurements may be transmitted to a patient operated device or clinician programmer using an implantable pulse generator (IPG) using an over-the-air (OTA) data transmission protocol, wherein the measurements are first stored in local memory in the IPG and then transmitted as requested by the patient operated device or clinician programmer.

The measurements may be collected over a lifetime of a patient implant and are used to analyze effectiveness.

The measurements may be collected over a lifetime of a patient implant and are aggregated with anonymized data from patient populations to understand disease progression over time.

The embodiments of the present disclosure, while illustrated and described in terms of various embodiments, is not limited to the particular description contained in this specification. Additional alternative or equivalent components and elements may be readily used to practice the present disclosure.

The invention claimed is:

1. A neuromodulation device for measuring an evoked response in a neurovascular bundle, the device comprising:
a first electrode;
a second electrode, wherein the first and second electrodes are alternately configured as a stimulation electrode in a first stimulation electrode configuration or a second alternate stimulation electrode configuration, and wherein the stimulation electrode is configured to apply a stimulus pulse to the neurovascular bundle;

a sensing electrode for sensing an evoked response to the stimulus pulse applied by the stimulation electrode to the neurovascular bundle; and a controller configured to make a first measurement after applying a first stimulus pulse to the neurovascular bundle using the first stimulation electrode configuration, to make a second measurement after applying a second stimulus pulse to the neurovascular bundle using the second alternate stimulation electrode configuration, and to add the first measurement and second measurement to determine the evoked response of the neurovascular bundle;

wherein the first measurement is based on a first noise signal and a first evoked response signal detected by the sensing electrode, wherein the second measurement is based on a second noise signal and a second evoked response signal detected by the sensing electrode, and wherein the first electrode, the second electrode, and the sensing electrode are configured such that first noise signal and the second noise signal interfere destructively, and the first evoked response signal and the second evoked response signal interfere constructively.

2. A device according to claim 1, wherein the stimulus pulse is biphasic and the controller is configured to consecutively alternate between the first stimulation electrode configuration and the second stimulation electrode configuration, thereby alternating a stimulus polarity of consecutive biphasic stimulus pulses.

3. A device according to claim 1, wherein the sensing electrode is located between the first and second electrodes.

4. A device according to claim 1, wherein the controller is configured to measure a number of evoked responses from a number of alternating pulses at a single amplitude and add up the measurements of the number of evoked responses at the single amplitude.

5. A device according to claim 1, wherein the controller is configured to measure a number of pairs of evoked responses and add up the measurements taken after a number of pairs of alternating pulses reaches a predetermined number.

6. A device according to claim 1, wherein the stimulation electrode provides alternating simulation pulses at fixed amplitudes and wherein the controller is configured to calculate a running average of measurements, for each fixed amplitude, taken at the sensing electrode during a ramp up process in which a sequence of the alternating stimulation pulses are increased from a lower amplitude to a higher amplitude.

7. The device according to claim 6, wherein the lower amplitude is zero, and the higher amplitude is a desired amplitude dose.

8. A device according to claim 6, wherein the controller is configured to calculate a linear progression of artefact based on the running average of measurements for each fixed amplitude during an initial phase of the ramp up process and calculate a predicted artefact contribution based on a projection of the linear progression.

9. A device according to claim 8, wherein the controller is configured to determine an eCAP dose response based on a difference between the predicted artefact contribution for a desired amplitude dose and an actual measurement at the desired amplitude dose.

10. A device according to claim 6, wherein the sensing electrode is coupled to an input reset amplifier that is configured in a reset state until $t_{RESET}$ delay after a transition edge of the stimulus pulse, wherein an input reset amplifier measurement is enabled for a fixed record length of $t_{RECORD}$, wherein the $t_{RESET}$ and $t_{RECORD}$ are programmable by the controller.

11. A device according to claim 10, wherein the $t_{RESET}$ delay is determined based on a propagation velocity of target fiber type and a distance between the sensing electrode and the first electrode or distance between the sensing electrode and the second electrode.

12. A device according to claim 10, wherein an output of the reset amplifier is sampled, quantized, filtered and windowed by a digital processor, wherein the output is then averaged across $t_{RECORD}$ length by the controller.

13. A device according to claim 12, wherein the averaged output is further processed to compute an area under the curve (AUC) or integral of a neural response across 'm' measurement cycles by the controller.

14. A device according to claim 13, wherein an eCAP signal classifier is used to compute a linear projection of an artefact AUC resulting from a sequence of stimulation pulses ramped from zero amplitude to a desired amplitude dose.

15. A device according to claim 14, wherein the eCAP signal classifier computes a projection of the maximal dose AUC onto an estimated artefact AUC as a distance measure for detecting an eCAP dose response.

16. A device according to claim 1, wherein the first electrode, the sensing electrode and the second electrodes are provided in a neural cuff, deployable about a target, comprising at least three distinct arms connected to a spine, wherein the first and second electrodes are located on outer arms and the sensing electrode is located on a center arm, which is between the outer arms.

17. The device of claim 16, wherein the sensing electrode is positioned symmetric with respect to the first and second stimulating electrodes, wherein the first and second electrodes are driven in a bipolar alternating configuration, and wherein a stimulation artefact produced by one or more of the first and second electrodes adds destructively to cancel other stimulation artefacts at the sensing electrode in the center arm thereby improving a signal to noise ratio of an eCAP response produced by a stimulating cathode electrode of one of the first or second electrodes, and wherein eCAP response detection is further improved by one or more of: (a) alternating the stimulating cathode electrode between the first and second electrodes in the outer arms and averaging an output of the sensing electrode in the center arm, and (b) blanking an amplification circuit during an active phase of a stimulation pulse.

18. The device of claim 1, wherein the sensing electrode comprises an electromechanical transducer to detect one or more of blood flow and blood pressure changes in response to an evoked arterial vasoconstriction caused by neuromodulation of the neurovascular bundle by either or both of the first electrode and second electrode, and wherein the detected one or more of blood flow and blood pressure is used to titrate an electrical dose delivered to the neurovascular bundle to improve therapeutic efficacy.

19. The device of claim 1, wherein the sensing electrode comprises two ultrasound transducers and a reflector configured to detect blood flow changes.

20. The device of claim 1, wherein measurement of the evoked response comprises measurement of a response to a sequence of electrical pulses of increasing charge applied in a fixed intermitted manner consisting of ON and OFF phases, wherein an ON phase comprises of a fixed number of stimulation pulses at a fixed stimulation frequency, wherein an OFF phase consists of no stimulation pulses for a fixed duration or a sequence of subthreshold pulses known not to cause a physiological response which allows the neurovascular bundle to return to a baseline.

21. The device of claim 20, wherein the sensing electrode comprises a plurality of electrically active monitoring devices and measures an eCAP response produced by a stimulating cathode electrode among the first or second electrodes resulting from an electrical dose, wherein the eCAP response to electrical dose is a measure of neurovascular bundle engagement.

22. The device of claim 21, wherein an accuracy of the measurement of the eCAP response resulting from the ON phases is improved by one or more of: (a) averaging measurements of each of the plurality of electrically active monitoring devices, (b) averaging a rectified area of the eCAP response, (c) averaging a peak-to-peak metric of the eCAP response, and (d) using negative or positive peak amplitudes of the eCAP response.

23. The device of claim 1, wherein the controller is further configured to determine a dose response to one or more stimulus pulses provided by the stimulation electrode, wherein the dose response is determined from a real-time change in an eCAP response and real-time changes in impedance measured across the sensing electrode, wherein the changes in impedance are correlated to changes in arterial blood flow or changes during an applied dose, wherein the changes in the eCAP response are correlated to changes in blood pressure during the applied dose, wherein the changes in the eCAP response are correlated to changes in heart-rate during the applied dose, and wherein changes in the eCAP response are correlated to changes in respiratory rate during the applied dose.

* * * * *